US008648845B2

(12) United States Patent
Chang et al.

(10) Patent No.: US 8,648,845 B2
(45) Date of Patent: Feb. 11, 2014

(54) WRITING DATA TO SUB-PIXELS USING DIFFERENT WRITE SEQUENCES

(75) Inventors: Shih Chang Chang, San Jose, CA (US); Cheng Ho Yu, Cupertino, CA (US); Zhibing Ge, Sunnyvale, CA (US); Hopil Bae, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 13/143,187

(22) PCT Filed: May 24, 2011

(86) PCT No.: PCT/US2011/037810

§ 371 (c)(1),
(2), (4) Date: Jul. 1, 2011

(87) PCT Pub. No.: WO2012/161703

PCT Pub. Date: Nov. 29, 2012

(65) Prior Publication Data

US 2012/0299983 A1 Nov. 29, 2012

(51) Int. Cl.
*G06F 3/038* (2013.01)

(52) U.S. Cl.
USPC ............................ 345/211; 345/690; 345/691

(58) Field of Classification Search
USPC ........... 345/87, 213, 690, 691, 100, 208, 211, 345/212, 39, 522
See application file for complete search history.

(56) References Cited

U.S. PATENT DOCUMENTS 5,483,261 A 1/1996 Yasutake
5,488,204 A 1/1996 Mead et al.
5,825,352 A 10/1998 Bisset et al.
5,835,079 A 11/1998 Shieh
5,880,411 A 3/1999 Gillespie et al.
6,188,391 B1 2/2001 Seely et al.
6,310,610 B1 10/2001 Beaton et al.
6,323,846 B1 11/2001 Westerman et al.
6,690,387 B2 2/2004 Zimmerman et al.
7,015,894 B2 3/2006 Morohoshi
7,184,064 B2 2/2007 Zimmerman et al.
7,663,607 B2 2/2010 Hotelling et al.

(Continued)

FOREIGN PATENT DOCUMENTS

EP 1 650 738 A1 4/2006
JP 2000-163031 A 6/2000
JP 2002-342033 A 11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Thuy Pardo
(74) *Attorney, Agent, or Firm* — Fletcher Yoder PC

(57) ABSTRACT

With respect to liquid crystal display inversion schemes, a large change in voltage on a data line can affect the voltages on adjacent data lines due to capacitive coupling between data lines. The resulting change in voltage on these adjacent data lines can give rise to visual artifacts in the data lines' corresponding sub-pixels. Various embodiments of the present disclosure serve to prevent or reduce persisting visual artifacts by offsetting their effects or by distributing their presence among different colored sub-pixels. In some embodiments, this may be accomplished by using different write sequences during the update of a row of pixels.

25 Claims, 13 Drawing Sheets

(56) References Cited

U.S. PATENT DOCUMENTS

| | | | | |
|---|---|---|---|---|
| 2004/0246216 | A1* | 12/2004 | Hosaka | 345/87 |
| 2006/0026521 | A1 | 2/2006 | Hotelling et al. | |
| 2006/0197753 | A1 | 9/2006 | Hotelling | |
| 2007/0115231 | A1 | 5/2007 | Kumeta | |
| 2008/0177994 | A1* | 7/2008 | Mayer | 713/2 |
| 2009/0002585 | A1* | 1/2009 | Shimoshikiryoh et al. | 349/39 |
| 2009/0085858 | A1* | 4/2009 | Hsu et al. | 345/100 |
| 2009/0122047 | A1* | 5/2009 | Yamamoto et al. | 345/211 |
| 2010/0079441 | A1* | 4/2010 | Sasaki et al. | 345/213 |
| 2010/0182333 | A1 | 7/2010 | Chiang | |
| 2010/0194736 | A1* | 8/2010 | Shingai et al. | 345/211 |
| 2010/0194793 | A1* | 8/2010 | Uehara | 345/691 |
| 2010/0195004 | A1 | 8/2010 | Hotelling | |
| 2010/0245311 | A1* | 9/2010 | Lewis et al. | 345/208 |
| 2011/0234605 | A1* | 9/2011 | Smith et al. | 345/522 |
| 2012/0086739 | A1* | 4/2012 | Akimoto et al. | 345/690 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," Chi ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Jan. 31, 2012, for PCT Application No. PCT/US2011/037810, filed May 24, 2011, seven pages.

* cited by examiner

Pixel *602* at Time T0

Pixel *604* at Time T0

Pixel *602* at Time T1

Pixel *604* at Time T1

Pixel *602* at Time T2

Pixel *604* at Time T2

Pixel 800 at Time T0

Pixel 810 at Time T0

Pixel 820 at Time T0

Pixel 800 at Time T1

Pixel 810 at Time T1

Pixel 820 at Time T1

Pixel 800 at Time T2

Pixel 810 at Time T2

Pixel 820 at Time T2

Pixel *1000* at Time T0 | Pixel *1010* at Time T0 | Pixel *1020* at Time T0 | Pixel *1030* at Time T0

Pixel *1000* at Time T1 | Pixel *1010* at Time T1 | Pixel *1020* at Time T1 | Pixel *1030* at Time T1

Pixel *1000* at Time T2 | Pixel *1010* at Time T2 | Pixel *1020* at Time T2 | Pixel *1030* at Time T2

WRITING DATA TO SUB-PIXELS USING DIFFERENT WRITE SEQUENCES

This application is a United States National Stage Application under 35 U.S.C. §371 of International Patent Application No. PCT/US2011/037810, filed May 24, 2011, which is incorporated by reference in its entirety for all intended purposes.

FIELD OF THE DISCLOSURE

This relates generally to the writing of data to sub-pixels in display screens.

BACKGROUND OF THE DISCLOSURE

Display screens of various types of technologies, such as liquid crystal displays (LCDs), organic light emitting diode (OLED) displays, etc., can be used as screens or displays for a wide variety of electronic devices, including such consumer electronics as televisions, computers, and handheld devices (e.g., cellular telephones, audio and video players, gaming systems, and so forth). LCD devices, for example, typically provide a flat display in a relatively thin package that is suitable for use in a variety of electronic goods. In addition, LCD devices typically use less power than comparable display technologies, making them suitable for use in battery-powered devices or in other contexts where it is desirable to minimize power usage.

LCD devices typically include multiple picture elements (pixels) arranged in a matrix. The pixels may be driven by scanning line and data line circuitry to display an image on the display that can be periodically refreshed over multiple image frames such that a continuous image may be perceived by a user. Individual pixels of an LCD device can permit a variable amount light from a backlight to pass through the pixel based on the strength of an electric field applied to the liquid crystal material of the pixel. The electric field can be generated by a difference in potential of two electrodes, a common electrode and a pixel electrode. In some LCDs, such as electrically-controlled birefringence (ECB) LCDs, the liquid crystal can be in between the two electrodes. In other LCDs, such as in-plane switching (IPS) and fringe-field switching (FFS) LCDs, the two electrodes can be positioned on the same side of the liquid crystal. In many displays, the direction of the electric field generated by the two electrodes can be reversed periodically. For example, LCD displays can scan the pixels using various inversion schemes, in which the polarities of the voltages applied to the common electrodes and the pixel electrodes can be periodically switched, i.e., from positive to negative, or from negative to positive. As a result, the polarities of the voltages applied to various lines in a display panel, such as data lines used to charge the pixel electrodes to a target voltage, can be periodically switched according to the particular inversion scheme.

SUMMARY

With respect to liquid crystal display inversion schemes, a large change in voltage on a data line can affect the voltages on adjacent data lines due to capacitive coupling between data lines. The resulting change in voltage on these adjacent data lines can give rise to visual artifacts in the data lines' corresponding sub-pixels. However, not all sub-pixels will have lasting visual artifacts. For example, the brightening or darkening of a sub-pixel may not result in a lasting artifact if the sub-pixel's data line is subsequently updated to a target data voltage during the updating of the sub-pixel's row in the current frame. This subsequent update can overwrite the changes in voltage that caused these visual artifacts. In contrast, visual artifacts may persist in sub-pixels that have already been written with data in the current frame because the brightening or darkening can remain until the sub-pixel is updated again in the next frame.

Various embodiments of the present disclosure serve to prevent or reduce these persisting visual artifacts by offsetting their effects or by distributing their presence among different colored sub-pixels. In some embodiments, this may be accomplished by using different write sequences during the update of a row of pixels.

DETAILED DESCRIPTION

In the following description of exemplary embodiments, reference is made to the accompanying drawings in which it is shown by way of illustration, specific embodiments, of the disclosure. It is to be understood that other embodiments can be used and structural changes can be made without departing from the scope of the embodiments of the disclosure.

Furthermore, although embodiments of the disclosure may be described and illustrated herein in terms of logic performed within a display driver, host video driver, etc., it should be understood that embodiments of the disclosure are not so limited, but can also be performed within a display subassembly, liquid crystal display driver chip, or within another module in any combination of software, firmware, and/or hardware.

Various embodiments of the invention use different write sequences to write data to a row of sub-pixels in a display screen during an update of the sub-pixels' row. These write sequences can control the sequence in which voltage is applied to each sub-pixel's data lines. In some scanning operations of display screens, such as some liquid crystal display inversion schemes, a large change in voltage on a data line can affect the voltages on adjacent data lines due to capacitive coupling between data lines. The resulting change in voltage on these adjacent data lines can give rise to visual artifacts in the data lines' corresponding sub-pixels. Using different write sequences can reduce or eliminate the presence of these visual artifacts.

Figure 1C:
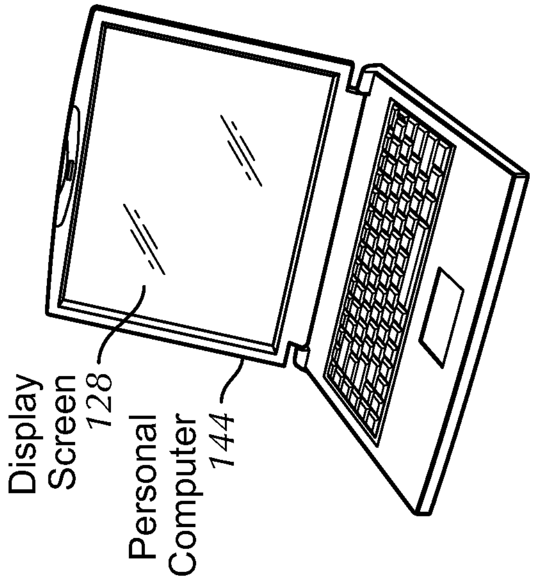
FIG. 1C illustrates an example personal computer according to embodiments of the disclosure.
Figure 1B:
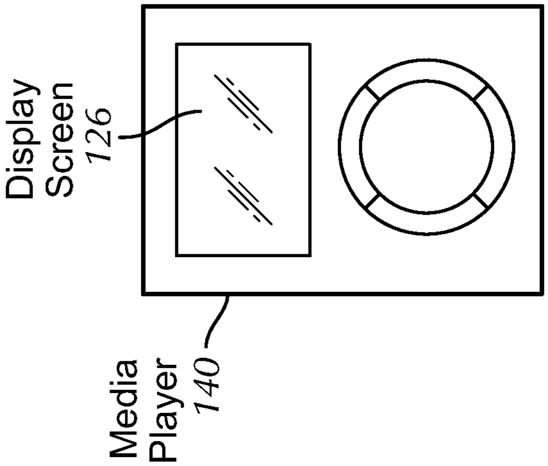
FIG. 1B illustrates an example digital media player according to embodiments of the disclosure.
Figure 1A:
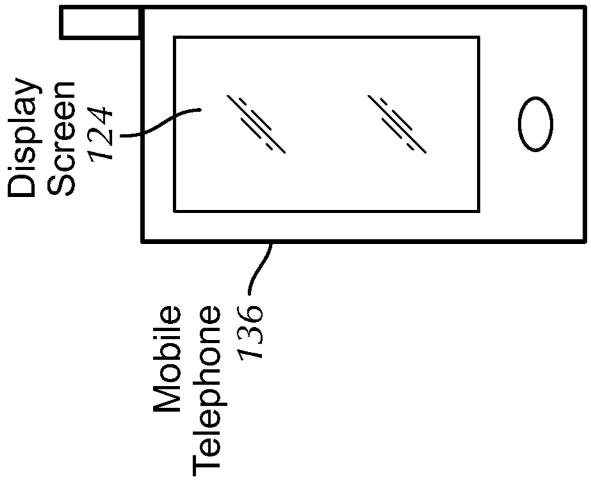
FIG. 1A illustrates an example mobile telephone according to embodiments of the disclosure.
Figure 1D:
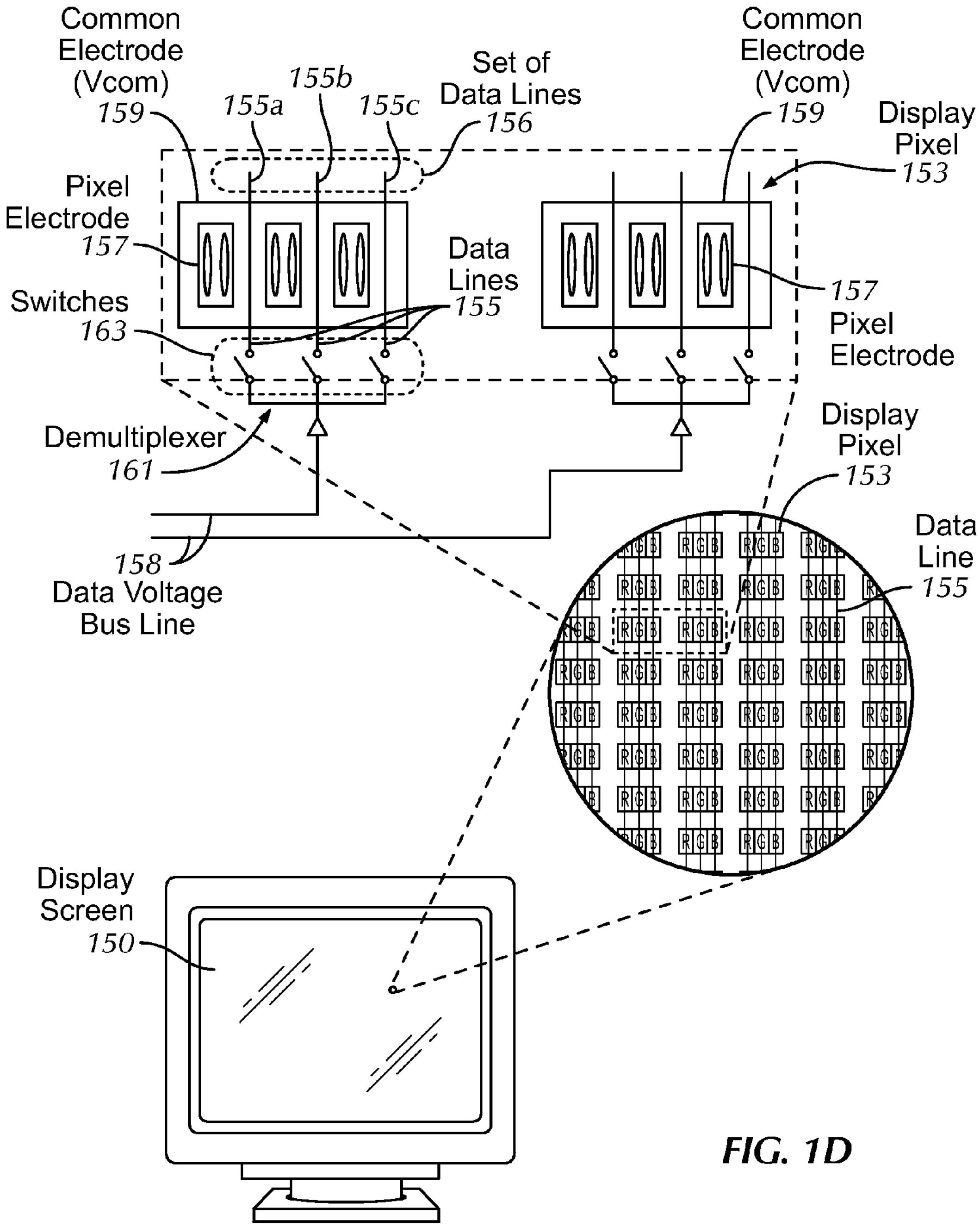
FIG. 1D illustrates an example display screen according to embodiments of the disclosure.

FIGS. 1A-1D show example systems in which display screens (which can be part of touch screens) according to embodiments of the disclosure may be implemented. FIG. 1A illustrates an example mobile telephone 136 that includes a display screen 124. FIG. 1B illustrates an example digital media player 140 that includes a display screen 126. FIG. 1C illustrates an example personal computer 144 that includes a display screen 128. FIG. 1D illustrates an example display screen 150, such as a stand-alone display. In some embodiments, display screens 124, 126, 128, and 150 can be touch screens in which touch sensing circuitry can be integrated into the display pixels. Touch sensing can be based on, for example, self capacitance or mutual capacitance, or another touch sensing technology. In some embodiments, a touch screen can be multi-touch, single touch, projection scan, full-imaging multi-touch, or any capacitive touch.

In some scanning methods, the direction of the electric field across the pixel material can be reversed periodically. In LCD displays, for example, periodically switching the direction of the electric field can help prevent the molecules of liquid crystal from becoming stuck in one direction. Switching the electric field direction can be accomplished by reversing the polarity of the electrical potential between the pixel electrode and the Vcom. In other words, a positive potential from the pixel electrode to the Vcom can generate an electric field across the liquid crystal in one direction, and a negative potential from the pixel electrode to the Vcom can generate an electric field across the liquid crystal in the opposite direction. In some scanning methods, switching the polarity of the potential between the pixel electrode and the Vcom can be accomplished by switching the polarities of the voltages applied to the pixel electrode and the Vcom. For example, during an update of an image in one frame, a positive voltage can be applied to the pixel electrode and a negative voltage can be applied to the Vcom. In a next frame, a negative voltage can be applied to the pixel electrode and a positive voltage can be applied to the Vcom. One skilled in the art would understand that switching the polarity of the potential between the pixel electrode and the Vcom can be accomplished without switching the polarity of the voltage applied to either or both of the pixel electrode and Vcom. In this regard, although example embodiments are described herein as switching the polarity of voltages applied to data lines, and correspondingly, to pixel electrodes, it should be understood that reference to positive/negative voltage polarities can represent relative voltage values. For example, an application of a negative polarity voltage to a data line, as described herein, can refer to application of a voltage with a positive absolute value (e.g., +1V) to the data line, while a higher voltage is being applied to the Vcom, for example. In other words, in some cases, a negative polarity potential can be created between the pixel electrode and the Vcom by applied positive (absolute value) voltages to both the pixel electrode and the Vcom, for example.

FIG. 1D illustrates some details of an example display screen 150. FIG. 1D includes a magnified view of display screen 150 that shows multiple display pixels 153, each of which can include multiple display sub-pixels, such as red (R), green (G), and blue (B) sub-pixels in an RGB display, for example. Data lines 155 can run vertically through display screen 150, such that a set 156 of three data lines (an R data line 155*a*, a G data line 155*b*, and a B data line 155*c*) can pass through an entire column of display pixels (e.g., vertical line of display pixels).

FIG. 1D also includes a magnified view of two of the display pixels 153, which illustrates that each display pixel can include pixel electrodes 157, each of which can correspond to one of the sub-pixels, for example. Each display pixel can include a common electrode (Vcom) 159 that can be used in conjunction with pixel electrodes 157 to create an electrical potential across a pixel material (not shown). Varying the electrical potential across the pixel material can correspondingly vary an amount of light emanating from the sub-pixel. In some embodiments, for example, the pixel material can be liquid crystal. A common electrode voltage can be applied to a Vcom 159 of a display pixel, and a data voltage can be applied to a pixel electrode 157 of a sub-pixel of the display pixel through the corresponding data line 155. A voltage difference between the common electrode voltage applied to Vcom 159 and the data voltage applied to pixel electrode 157 can create the electrical potential through the liquid crystal of the sub-pixel. The electrical potential can generate an electric field through the liquid crystal, which can cause inclination of the liquid crystal molecules to allow polarized light from a backlight (not shown) to emanate from the sub-pixel with a luminance that depends on the strength of the electric field (which can depend on the voltage difference between the applied common electrode voltage and data voltage). In other embodiments, the pixel material can include, for example, a light-emitting material, such as can be used in organic light emitting diode (OLED) displays.

In this example embodiment, the three data lines 155 in each set 156 can be operated sequentially. For example, a display driver or host video driver (not shown) can multiplex an R data voltage, a G data voltage, and a B data voltage onto a single data voltage bus line 158 in a particular sequence, and then a demultiplexer 161 in the border region of the display can demultiplex the R, G, and B data voltages to apply the data voltages to data lines 155*a*, 155*b*, and 155*c* in the particular sequence. Each demultiplexer 161 can include three switches 163 that can open and close according to the particular sequence of sub-pixel charging for the display pixel. In an R-G-B sequence, for example, data voltages can be multiplexed onto data voltage bus line 158 such that R data voltage is applied to R data line 155*a* during a first time period, G data voltage is applied to G data line 155*b* during a second time period, and B data voltage is applied to B data line 155*c* during a third time period. Demultiplexer 161 can demultiplex the data voltages in the particular sequence by closing switch 163 associated with R data line 155*a* during the first time period when R data voltage is being applied to data voltage bus line 158, while keeping the green and blue switches open such that G data line 155*b* and B data line 155*c* are at a floating potential during the application of the R data voltage to the R data line. In this way, for example, the red data voltage can be applied to the pixel electrode of the red sub-pixel during the first time period. During the second time period, when G data voltage is being applied to G data line 155*b*, demultiplexer 161 can open the red switch 163, close the green switch 163, and keep the blue switch 163 open, thus applying the G data voltage to the G data line, while the R data line and B data line are floating. Likewise, the B data voltage can be applied during the third time period, while the G data line and the R data line are floating.

As will be described in more detail below with respect to example embodiments, applying a data voltage to a data line can affect the voltages on surrounding, floating data lines. In some cases, the effect on the voltages of floating data lines can affect the luminance of the sub-pixels corresponding to the affected data lines, causing the sub-pixels to appear brighter or darker than intended. The resulting increase or decrease in sub-pixel luminance can be detectable as a visual artifact in some displays.

In some embodiments, thin film transistors (TFTs) can be used to address display pixels, such as display pixels 153, by scanning lines of display pixels (e.g., rows of display pixels) in a particular order. When each line is updated during the scan of the display, data voltages corresponding to each display pixel in the updated line can be applied to the set of data lines of the display pixel through the demuxing procedure described above, for example.

Figure 2:
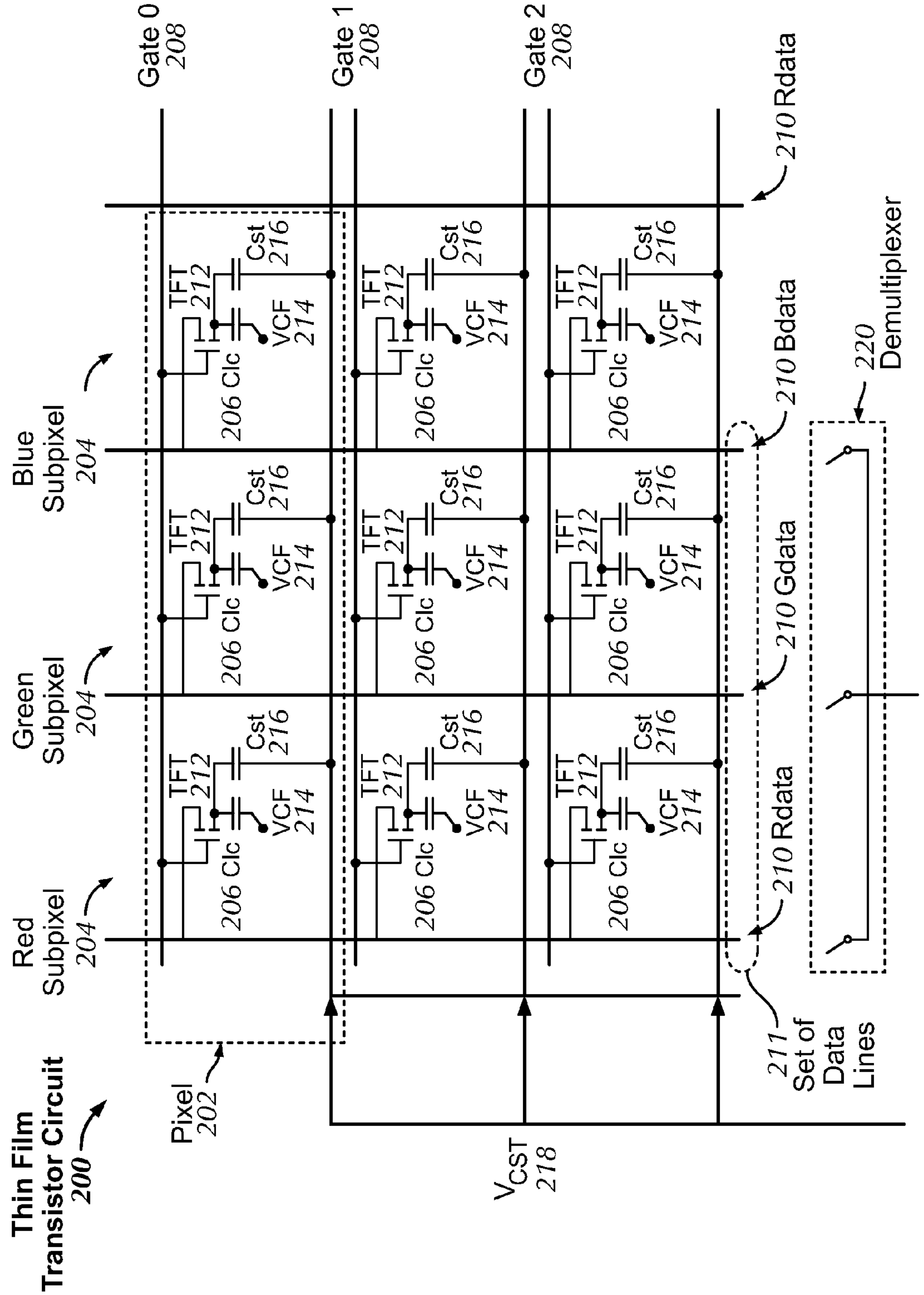
FIG. 2 illustrates an example thin film transistor (TFT) circuit according to embodiments of the disclosure.

FIG. 2 illustrates a portion of an exemplary TFT circuit 200 according to embodiments of the present disclosure. As shown by the figure, the thin film transistor circuit 200 can include multiple pixels 202 arranged into rows, or scan lines, with each pixel 202 containing a set of color sub-pixels 204 (red, green, and blue, respectively). It is understood that a plurality of pixels can be disposed adjacent each other to form a row of the display. Each color reproducible by the liquid crystal display can therefore be a combination of three levels of light emitted from a particular set of color sub-pixels 204.

Color sub-pixels may be addressed using the thin film transistor circuit's 200 array of scan lines (called gate lines 208) and data lines 210. Gate lines 208 and data lines 210 formed in the horizontal (row) and vertical (column) directions, respectively, and each column of display pixels can include a set 211 of data lines including an R data line, a G data line, and a B data line. Each sub-pixel may include a pixel TFT 212 provided at the respective intersection of one of the gate lines 208 and one of the data lines 210. A row of sub-pixels may be addressed by applying a gate signal on the row's gate line 208 (to turn on the pixel TFTs of the row), and by applying voltages on the data lines 210 corresponding to the amount of emitted light desired for each sub-pixel in the row. The voltage level of each data line 210 may be stored in a storage capacitor 216 in each sub-pixel to maintain the desired voltage level across the two electrodes associated with the liquid crystal capacitor 206 relative to a voltage source 214 (denoted here as $V_{cf}$). A voltage $V_{cf}$ may be applied to the counter electrode (common electrode) forming one plate of the liquid crystal capacitance with the other plate formed by a pixel electrode associated with each sub-pixel. One plate of each of the storage capacitors 216 may be connected to a common voltage source Cst along line 218.

Applying a voltage to a sub-pixel's data line can charge the sub-pixel (e.g., the pixel electrode of the sub-pixel) to the voltage level of the applied voltage. Demultiplexer 220 in the border region of the display can be used to apply the data voltages to the desired data line. For example, demultiplexer 220 can apply data voltages to the R data line, the G data line, and the B data line in a set 211 in a particular sequence, as described above with reference to FIG. 1D. Therefore, while a voltage can be applied to one data line (e.g., red), the other data lines (e.g., green and blue) in the pixel can be floating. However, applying a voltage to one data line can affect the voltage on floating data lines, for example, because a capacitance existing between data lines can allow voltage changes on one data line to be coupled to other data lines. This capacitive coupling can change the voltage on the floating data lines, which can make the sub-pixels corresponding to the floating data lines appear either brighter or darker depending on whether the voltage change on the charging data line is in the same direction or opposite direction, respectively, as the polarity of the floating data line voltage. In addition, the amount of voltage change on the floating data line can depend on the amount of the voltage change on the charging data line.

By way of example, a negative data voltage, e.g., −2V, may be applied to data line A during the scan of a first line. Then, during the scan of the next line, a positive data voltage, e.g., +2V, may be applied to data line A, thus swinging the voltage on data line A from −2V to +2V, i.e., a positive voltage change of +4V. Voltages on floating data lines surrounding data line A can be increased by this positive voltage swing. For example, the positive swing on data line A can increase the voltage of an adjacent data line B floating at a positive voltage, thus, increasing the magnitude of the positive floating voltage and making the sub-pixel corresponding to data line B appear brighter. Likewise, the positive voltage swing on data line A can increase the voltage of an adjacent data line C floating at a negative voltage, thus decreasing the magnitude of the negative floating voltage and making the sub-pixel corresponding to sub-pixel C appear darker. Thus, the appearance of visual artifacts of brighter or darker sub-pixels can depend on, for example, the occurrence of large voltage changes on one or more data lines during scanning of a display and the polarity of surrounding data lines with floating voltages during the large voltage changes.

In addition, the appearance of visual artifacts can depend on the particular sequence in which the data voltages are applied. Further to the example above, after a data voltage is applied to data line A, a data voltage may be applied to data line B (data line B being next in sequence). In this case, the effect of the voltage swing on data line A, i.e., the increase in the voltage on data line B, can be "overwritten" by the subsequent charging of data line B.

While the particular sequence in which the data voltages are applied to a set of data lines can be independent of the type of inversion scheme, the occurrence of large voltage changes in data lines, and the polarities of the floating voltages on adjacent data lines during the large voltage changes, can each depend on the type of inversion scheme used to operated the display. In some displays, a column inversion scheme, a line (row) inversion scheme, or a dot inversion scheme can be used, for example. Some example inversion schemes, and corresponding mechanisms that can introduce the display artifacts described above, will now be described.

Column Inversion

In a column inversion scheme, for example, the polarity of the data voltages applied to a particular data line can remain the same throughout the scan of all of the rows of the display in one frame update, i.e., an update of the displayed image by scanning through all of the rows to update the voltages on each sub-pixel of the display. In other words, while the particular voltage values applied to a particular data line can change from one row scan to another row scan, the polarity of the data voltages on the particular data line can remain the same throughout the scan. In the next frame, the polarity of the data voltages can be reversed, for example. In other words, polarity changes on data line voltage may only occur in between frames. Therefore, large voltage changes (e.g., a swing in voltage from one polarity to another polarity) on a data line may only occur during the scan of the first line of a new frame, for example.

While the polarity of the data line voltages applied to each data line can remain the same throughout the scan of a single frame in column inversion, the polarity of the voltage applied to each data line can alternate across a scanned row of sub-pixels; i.e., during a scan of one row, positive polarity data voltages can be applied to some of the data lines and negative polarity data voltages can be applied to the other data lines.

Figure 3A:
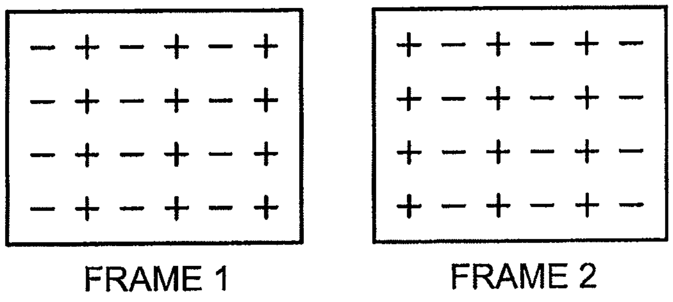
FIG. 3A illustrates an example one-column inversion scheme according to embodiments of the disclosure.

This alternating pattern is illustrated in FIG. 3A which shows columns with voltages of alternating polarities. The polarity of the voltage can remain the same along a column but alternate across a row. In the next frame, the polarity of the data voltages can be reversed. Other column inversion schemes, including two-column inversion illustrated in FIG. 3B, and three-column inversion illustrated in FIG. 3C, can operate according to similar principles.

Figure 4A:
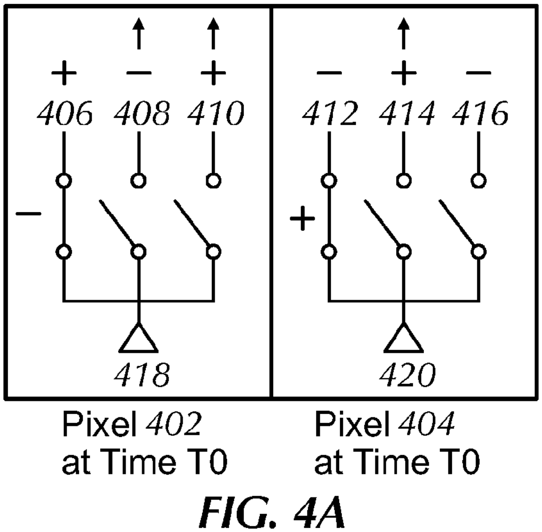
FIGS. 4A, 4B, and 4C illustrate an example alternating voltage polarity pattern according to an embodiment of a column inversion scheme.
Figure 4B:
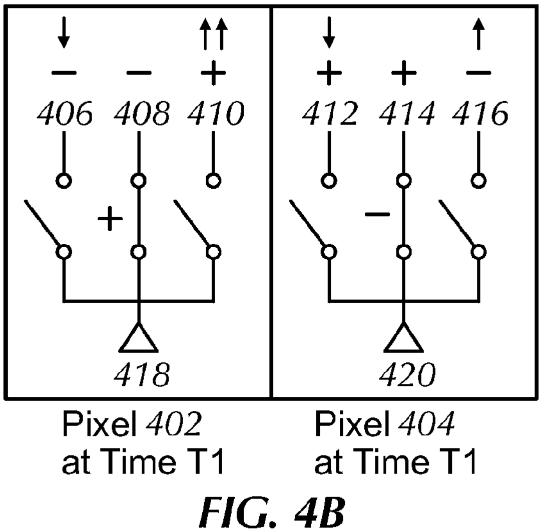
Figure 4C:
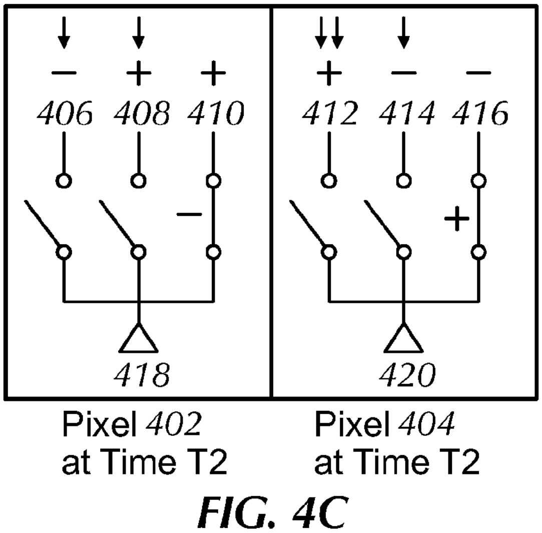

FIGS. 4A, 4B, and 4C illustrate an example alternating voltage polarity pattern across a scanned row in one embodiment of a column inversion scheme. FIGS. 4A, 4B, and 4C illustrate two adjacent pixels 402 and 404 along the same row at different points in time, T0, T1, and T2, during a scan of the row. Pixel 402 has a red sub-pixel with red data line 406, a green sub-pixel with green data line 408, and a blue sub-pixel with blue data line 410. A demultiplexer 418 located in the border region of the display can operate the data lines of pixel 402. The demultiplexer receives the RGB data signals for each sub-pixel and feeds each signal to the appropriate RGB data line at the appropriate timing as dictated by timing and control circuitry (not shown), for example, as described above. Pixel 404 similarly has a red data line 412, a green data line 414, a blue data line 416, and a demultiplexer 420. Although writing, i.e., application of data voltages to the data lines, may occur in any sequence, the embodiment shown in FIGS. 4A, 4B, and 4C uses an RGB write sequence for each sub-pixel.

An RGB write sequence for the sub-pixels may be applied simultaneously to each sub-pixel in a row of the display during the scan of the row. After the scan of the row is complete, a next row in the scanning order can be likewise scanned. The scanning process can continue scanning rows in a particular scanning order until all of the rows of the display are refreshed, i.e., a single frame update.

The RGB write sequence first writes data to each red sub-pixel in the row at time T0; next writes data to each green sub-pixel in the row at time T1; and finally writes data to each blue sub-pixel in the row at time T2. To accomplish this writing sequence, demultiplexers select the desired sub-pixel for writing, while a voltage can then be applied to the sub-pixel's corresponding data line. As shown in FIGS. 4A, 4B, and 4C, a "+" or "−" is located above each sub-pixel data line. These signs represent the polarity of the sub-pixel's data line voltage from the previous update. The "+" or "−" sign next to the closed switch represents the polarity of the voltage being applied to the data line. In the present example, pixels 402 and 404 may be in the first row scanned in a frame. In this example, the polarity of the data voltages can be reversed in between the previous frame and the new frame. Therefore, the "+" or "−" sign above each sub-pixel data line shows the prior voltage polarity from the previous update. This polarity is opposite to the polarity of the voltage applied in the current update. In this case, the data line voltages applied in the scan of this first row can result in a large voltage change in each data line, as the voltage on each data line can swing from + to − or from − to +.

FIG. 4A, for example, illustrates the writing of data to the red sub-pixels by application of a voltage to red data lines 406 and 412 at time T0. As illustrated, demultiplexers 418 and 420 can apply a voltage to the red data lines. Doing so can change the polarity of the voltages on red data line 406 from + to − and from − to + on red data line 412. Because the voltages applied to the red data lines can swing the data line voltages from one polarity to the opposite polarity, the voltage change on the red data lines can be large. While a voltage is being applied to the red data lines, the green and blue data lines can be floating. The large voltage change on the red data lines can affect the voltages on other data lines, for example, due to capacitive coupling between data lines. In particular, the capacitance existing between two data lines can allow voltage changes on one data line to affect the voltages on other data lines. While there may be some amount of capacitance existing between a particular data line and each and every other data line, the amount of capacitance can vary depending on the distance between two data lines and may be greatest between two adjacent data lines. Accordingly, the following discussion can ignore the impact on non-adjacent data lines.

Here, the voltage on red data line 406 can swing from a positive polarity to a negative polarity. The negative change in voltage can affect the negative voltage on green data line 408. Because the voltage on green data line 408 is negative, the negative change in voltage on red data line 406 can increase the magnitude of the negative voltage on green data line 408. Accordingly, the sub-pixel corresponding to green data line 408 can brighten. This brightening effect is represented by the upward pointing arrow above green data line 408. Although the negative change in voltage can also affect the voltage on blue data line 410, the blue data line is not adjacent to the red data line. As such, the impact on blue data line 410 can be ignored.

With respect to red data line 412, the swing in voltage from a negative polarity to a positive polarity can affect the voltage on green data line 414. Because the voltage on green data line 414 has a positive polarity, the positive change in voltage on red data line 412 can increase the magnitude of the voltage on green data line 414, which can cause the corresponding green sub-pixel to brighten. This brightening effect is represented by the upward pointing arrow above green data line 414. Similarly, the positive change in voltage on red data line 412 can increase the magnitude of the positive voltage on blue data line 410 in adjacent pixel 402, which can cause the corresponding blue sub-pixel to appear brighter. The impact on non-adjacent blue data line 416 can be ignored.

FIG. 4B illustrates the writing of data to the green sub-pixels by application of a voltage to green data lines 408 and 414 at time T1. As illustrated, demultiplexers 418 and 420 can apply a voltage to the green data lines. Doing so can change the polarity of the voltage on green data line 408 from − to + and the polarity of the voltage on green data line 414 from + to −. The application of voltages to green data lines 408 and 414 can overwrite any changes in voltage that occurred on the green data lines before time T1. This overwriting is represented by the absence of the upward pointing arrows above green data lines 408 and 414.

The large voltage change on the green data lines can affect the voltages on the red and blue data lines. In this example, the large positive voltage change on green data line 408 can swing the polarity from − to +. This large positive voltage change can cause a positive voltage change in red data line 406. Because the polarity of red data line 406 voltage is negative, the positive voltage change on green data line 408 can reduce the magnitude of the red data line 406 voltage, which can make the corresponding red sub-pixel to appear darker. This darkening effect is represented by the downward pointing arrow above red data line 406. The large positive voltage change on green data line 408 can increase the magnitude of the positive voltage on blue data line 410, which can cause the corresponding blue sub-pixel to appear brighter. This brightening effect is represented by the upward pointing arrow above blue data line 410. As illustrated in FIG. 4B, two upward pointing arrows appear above blue data line 410 because the corresponding blue sub-pixel can brighten first at time T0 and again at time T1.

The change in voltage on green data line 414 can affect the voltage on red data line 412 and blue data line 416. With respect to red data line 412, the large negative change in voltage on green data line 414 can decrease the magnitude of the positive voltage on red data line 412, which can make the corresponding red sub-pixel appear darker as represented by the downward pointing arrow. With respect to blue data line 416, the large negative change in voltage on green data line 414 can increase the magnitude of the negative voltage on blue data line 416, which can make corresponding blue sub-pixel appear brighter as represented by the upward pointing arrow.

FIG. 4C illustrates the writing of data to the blue sub-pixels by application of a voltage to blue data lines 410 and 416. Just as above, demultiplexers 418 and 420 apply a voltage to the blue data lines. Doing so changes the polarity of the voltages on the blue data lines from + to − on data line 410 and from − to + on data line 416. The application of voltages to blue data lines 410 and 416 can overwrite any changes in voltage that occurred on the blue data lines before time T2. This overwriting is represented by the absence of the upward pointing arrows above blue data lines 410 and 416.

The change in voltage on blue data line 410 can affect the voltage on green data line 408 and red data line 412 in adjacent pixel 404. Although the change in voltage on blue data line 410 can also affect the voltage on non-adjacent red data line 406, this impact can be ignored. With respect to green data line 408, the large negative change in voltage on blue data line 410 can cause a negative voltage change on green data line 408. Because the polarity of green data line 408 is positive, the negative voltage change can reduce the magnitude of the green data line voltage, which can make the green sub-pixel appear darker as represented by the downward pointing arrow. With respect to red data line 412, the large negative voltage change on blue data line 410 can reduce the magnitude of the positive voltage on red data line 412 in the adjacent pixel, which can make the red sub-pixel appear darker as represented by the downward pointing arrow. As illustrated in FIG. 4C, two downward pointing arrows appear above red data line 412 because the corresponding red sub-pixel can darken first at time T1 and again at time T2.

In a similar fashion, the large positive change in voltage on blue data line 416 can change the voltage on green data line 414. This positive voltage change can reduce the magnitude of the negative voltage on green data line 414, which can make the green sub-pixel appear darker as represented by the downward pointing arrow. The impact on non-adjacent red data line 412 can be ignored.

As illustrated by the downward pointing arrows above red data lines 406 and 412 and green data lines 408 and 414 in FIG. 4C, visual artifacts can appear in the data lines' corresponding sub-pixels when the illustrated column inversion scheme is used.

Line (Row) Inversion

In line (row) inversion, the polarity of the voltages applied to the data lines during the scan of one row can be different from the polarity of the voltages applied during the scan of another row in the same frame. In contrast to column inversion, large changes in data voltages can occur for multiple scan lines due to multiple changes in polarity throughout the scanning of a single frame. Capacitive coupling between data lines can also introduce visual artifacts in line inversion schemes.

Figure 5A:
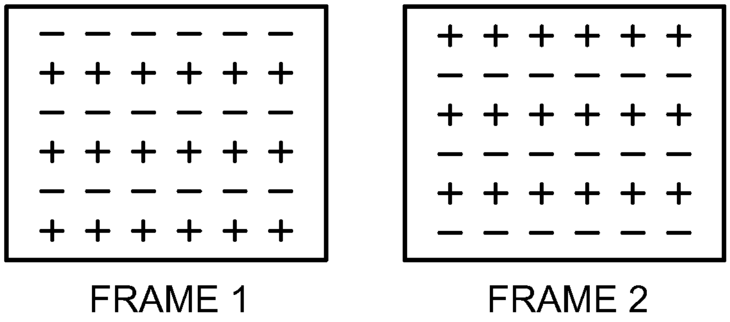
FIG. 5A illustrates an example one-line inversion scheme according to embodiments of the disclosure.
Figure 5B:
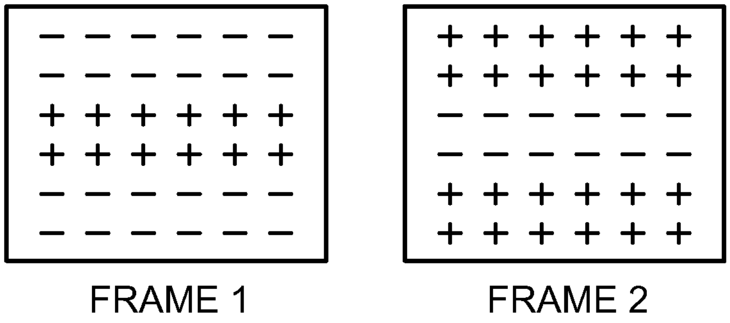
FIG. 5B illustrates an example two-line inversion scheme according to embodiments of the disclosure.
Figure 5C:
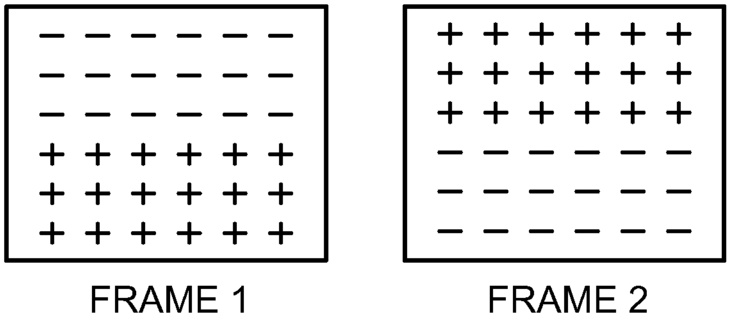
FIG. 5C illustrates an example three-line inversion scheme according to embodiments of the disclosure.

In line inversion, the polarity of the voltage on each sub-pixel is the same for all sub-pixels in the same row, and this polarity alternates from row to row. This configuration is illustrated in FIG. 5A. In the next frame, the polarity of the data voltages can be reversed. Other line inversion schemes, including two-line inversion illustrated in FIG. 5B, and three-line inversion illustrated in FIG. 5C, can operate according to similar principles. In two-line inversion, every block of two rows can have the same polarity. In three-line inversion, every block of three rows can have the same polarity.

Figure 6A:
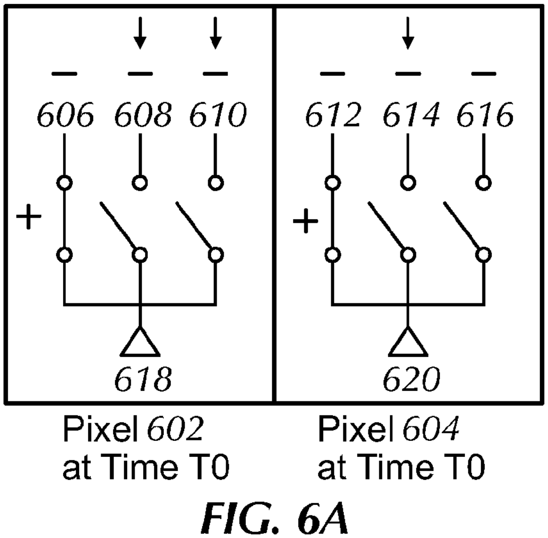
FIGS. 6A, 6B, and 6C illustrate an example constant voltage polarity pattern in a line inversion scheme according to embodiments of the disclosure.
Figure 6B:
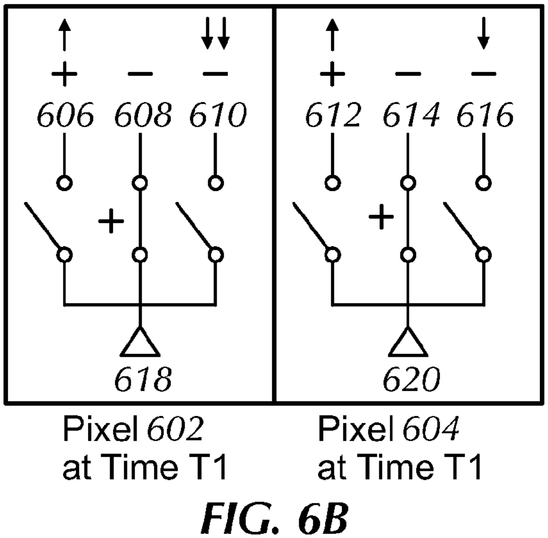
Figure 6C:
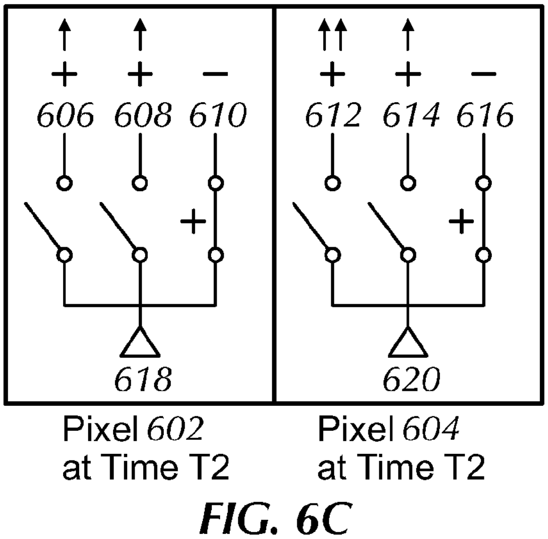

FIGS. 6A, 6B, and 6C illustrate an example of a constant voltage polarity pattern across a scanned row in one embodiment of a line inversion scheme. FIGS. 6A, 6B, and 6C illustrate two adjacent pixels 602 and 604 arranged along the same row at different points in time, T0, T1, and T2, during a scan of the row. Pixel 602 has a red sub-pixel with red data line 606, a green sub-pixel with green data line 608, a blue sub-pixel with blue data line 610. A demultiplexer 618 located in the border region of the display can operate the data lines of pixel 602. The demultiplexer receives the RGB data signals for each sub-pixel and feeds each signal to the appropriate RGB data line at the appropriate timing as dictated by timing and control circuitry (not shown), for example, as described above. Pixel 604 similarly has a red data line 612, a green data line 614, a blue data line 616, and a demultiplexer 604. Although writing, i.e., application of data voltages to the sub-pixels, may occur in any sequence, the embodiment shown in FIGS. 6A, 6B, and 6C uses an RGB write sequence for each sub-pixel.

As explained above, an RGB write sequence for the sub-pixels may be applied simultaneously to each sub-pixel in a row of the display during the scan of the row. After the scan of the row is complete, a next row in the scanning order can be likewise scanned until all of the rows of the display are refreshed, i.e., a single frame update.

The RGB write sequence first writes data to each red sub-pixel in the row at time T0; next writes data to each green sub-pixel in the row at time T1; and finally writes data to each blue sub-pixel in the row at time T2. To accomplish this writing sequence, demultiplexers select the desired sub-pixel for writing, while a voltage is then applied to the sub-pixel's corresponding data line. As shown in FIGS. 6A, 6B, and 6C, a "+" or "−" is located above each data line. Like FIGS. 4A, 4B, and 4C, these signs represent the polarity of the sub-pixel's data line voltage value from the previous update. The "+" or "−" sign next to the closed switch represents the polarity of the voltage being applied to the data line. In the present example, pixels 602 and 604 may be in the first row scanned in a frame. In this example, the polarity of the data line voltages can be reversed in between the previous frame and the new frame. In this case, the data line voltages applied in the scan of this first row can result in a large voltage change in each data line, as the voltage on each data line can swing from + to − or from − to +.

FIG. 6A, for example, illustrates the writing of data to the red sub-pixels by application of a voltage to red data lines 606 and 612 at time T0. As illustrated, demultiplexers 618 and 620 can apply a voltage to red data lines 606 and 612. Doing so can change the polarity of the voltages on red data lines 606 and 612 from − to +. Because the voltages applied to the red data lines can swing the data line voltages from one polarity to the opposite polarity, the voltage change on the red data lines can be large during the scan of the first row in each update block. While these voltages are applied to the red data lines, the green and blue data lines can be floating. As such, the large voltage changes on the red data lines can affect the voltages on adjacent data lines.

With respect to red data line 606, the large positive change in voltage can reduce the magnitude of the negative voltage on green data line 608, which can cause the corresponding green sub-pixel to appear darker. This darkening effect is represented by the downward pointing arrow above green data line 608. The impact on non-adjacent blue data line 610 due to the change in voltage on red data line 606 can be ignored.

With respect to red data line 612, the large positive change in voltage can reduce the magnitude of the negative voltages on green data line 614 and blue data line 610 in adjacent pixel 602. The reduction in voltage magnitude can cause the corresponding green and blue sub-pixels to appear darker. This darkening effect is represented by the downward pointing arrows above green data line 614 and blue data line 610. The impact on non-adjacent blue data line 616 due to the change in voltage on red data line 612 can be ignored.

FIG. 6B illustrates the writing of data to the green sub-pixels by application of a voltage to green data lines 608 and 614 at time T1. As illustrated, demultiplexers 618 and 620 apply a voltage to the green data lines. Doing so can change the polarity of the voltages on the green data lines 608 and 614 from − to +. The application of voltages to green data lines 608 and 614 can overwrite any changes in voltage that occurred on the green data lines before time T1. This overwriting is represented by the absence of the upward pointing arrows above green data lines 608 and 614.

The large voltage change on the green data lines can affect the voltages on the red data lines, for example, due to capacitive coupling between data lines. In this example, the large positive voltage change on the green data lines 608 and 614 can swing the polarity from − to +. This positive voltage difference can cause a positive voltage change on red data lines 606 and 612. Because the polarity of the red data line voltage is positive, the positive voltage change can increase the magnitude of the red data line voltages, which can make the red sub-pixels appear brighter as represented by the upward pointing arrows above red data lines 606 and 612.

The change in voltage on the green data lines can also affect the voltage level of blue sub-pixels corresponding to data lines 610 and 616. In this example, the large positive voltage change on the green data lines 608 and 614 can reduce the magnitude of the negative voltages on blue data lines 610 and 616, which can make the corresponding blue sub-pixels appear darker. This darkening effect is represented by the downward pointing arrows above blue data lines 610 and 616. Two downward pointing arrows appear above blue data line 610 because the corresponding blue sub-pixel can first darken at time T0 and again at time T1.

FIG. 6C illustrates the writing of data to the blue sub-pixels by application of a voltage to blue data lines 610 and 616. Just as above, demultiplexers 618 and 620 can apply a voltage to the blue data lines. Doing so changes the polarity of the voltages on blue data lines 610 and 616 from − to +. The application of voltages to blue data lines 610 and 616 can overwrite any changes in voltage that occurred on the blue data lines before time T2. This overwriting is represented by the absence of the downward pointing arrows above blue data lines 610 and 616.

The large positive change in voltage on blue data line 610 can affect the voltage on blue data line 608. In this example, the positive change in voltage on blue data line 610 can increase the magnitude of the positive voltage on green data line 608, which can cause the corresponding green sub-pixel to appear brighter. Similarly, the positive change in voltage on blue data line 610 can increase the magnitude of the positive voltage on red data line 612 in adjacent pixel 604, which can cause the corresponding red sub-pixel to brighten. These brightening effects are represented by the upward pointing arrows above green data line 608 and red data line 612. Two upward pointing arrows appear above red data line 612 because the corresponding red sub-pixel can brighten first at time T1 and again at time T2. The impact on non-adjacent red data line 606 due to the change in voltage on blue data line 610 can be ignored.

The large positive change in voltage on blue data line 616 can similarly increase the magnitude of the positive voltage on green data line 614, which can cause the corresponding green sub-pixel to appear brighter as represented by the upward pointing arrow above green data line 614. The impact on non-adjacent red data line 612 due to the change in voltage on blue data line 616 can be ignored.

As illustrated by the upward pointing arrows above red data lines 606 and 612 and green data lines 608 and 614 in FIG. 4C, visual artifacts can appear in the data lines' corresponding sub-pixels when the illustrated line inversion scheme is used.

Dot Inversion

Figure 7A:
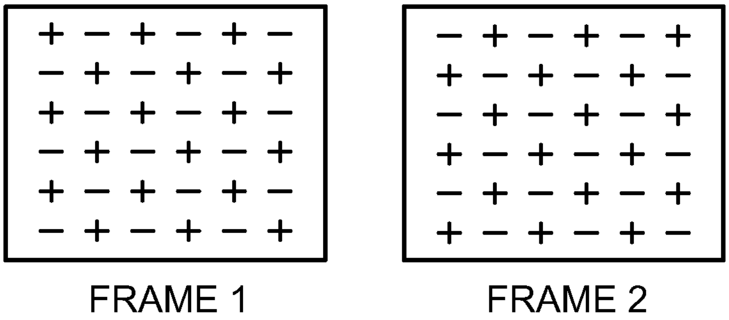
FIG. 7A illustrates an example dot inversion scheme according to embodiments of the disclosure.

A dot inversion scheme combines both line inversion and column inversion. Accordingly, the polarity of the data voltages applied to the data lines can be inverted along every data line as well as every row. In the next frame, the polarity of the data voltage can be reversed. This configuration is illustrated in FIG. 7A which shows, for example, alternating rows and columns of + and − voltages. In the next frame, the polarity of the data voltages can be reversed. Other dot inversion schemes, including two-column multi-dot inversion illustrated in FIG. 7B, and three-column multi-dot inversion illustrated in FIG. 7C, can operate according to similar principles.

Figure 7B:
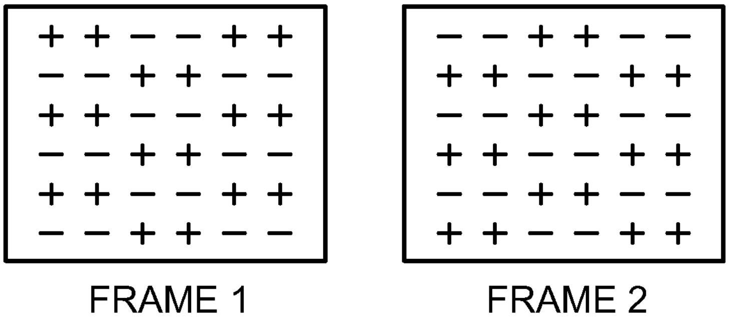
FIG. 7B illustrates an example two-column multi-dot inversion scheme according to embodiments of the disclosure.
Figure 7C:
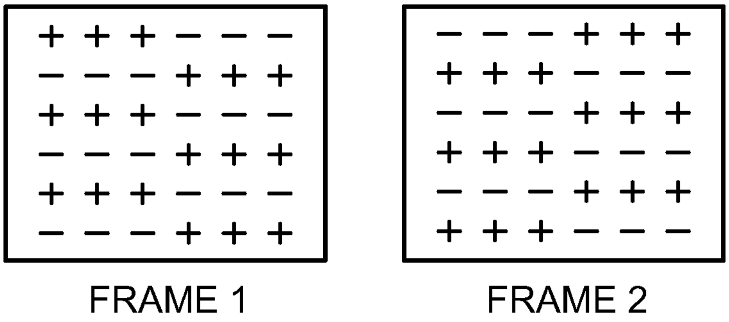
FIG. 7C illustrates an example three-column multi-dot inversion scheme according to embodiments of the disclosure.

With respect to each row of the display panel, the dot inversion schemes illustrated in FIGS. 7A, 7B, and 7C can resemble column inversion schemes. In the first row of the dot inversion scheme illustrated in FIG. 7A, for example, there are alternating columns of + and − voltages. This configuration is similar to using a one-column inversion scheme along the row. Similar patterns may apply to FIGS. 7B and 7C. In the first row of the two-column multi-dot inversion scheme illustrated in FIG. 7B, for example, alternating groups of two columns each have + and − voltages. This configuration is similar to using a two-column inversion scheme along each row. Similarly, each row of a three-column multi-dot inversion scheme may resemble a three-column inversion scheme.

In view of the similarity between dot inversion and column inversion, similar visual artifacts described above with respect to column inversion can also apply to each row of a dot inversion scheme.

As explained above with respect to the different inversion schemes, a large change in voltage on a data line can affect the voltages on adjacent data lines due to capacitive coupling between data lines. The resulting change in voltage on these adjacent data lines can give rise to visual artifacts in the data lines' corresponding sub-pixels. However, not all sub-pixels will have lasting visual artifacts. For example, the brightening or darkening of a sub-pixel may not result in a lasting artifact if the sub-pixel's data line is subsequently updated to a target data voltage during the updating of the sub-pixel's row in the current frame. This subsequent update can overwrite the changes in voltage that caused these visual artifacts. In contrast, visual artifacts may persist in sub-pixels that have already been written with data in the current frame because the brightening or darkening can remain until the sub-pixel is updated again in the next frame. Various embodiments of the present disclosure serve to prevent or reduce these persisting visual artifacts by offsetting their effects or by distributing their presence among different colored sub-pixels. In some embodiments, this may be accomplished by using different write sequences during the update of a row of pixels.

By way of example, a method of offsetting the appearance of visual artifacts may be described with respect to an embodiment of a two-column inversion scheme. The following description first describes how visual artifacts appear in a two-column inversion scheme. This description is followed by an explanation of how these visual artifacts may be offset.

Figure 3B:
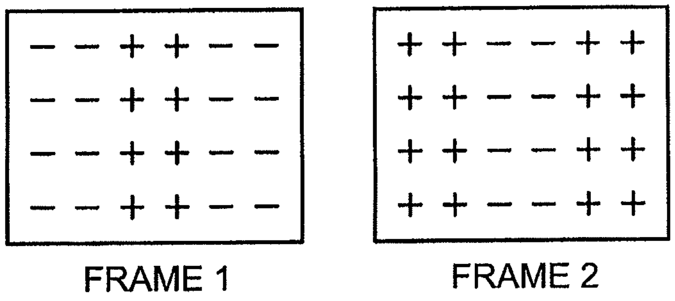
FIG. 3B illustrates an example two-column inversion scheme according to embodiments of the disclosure.
Figure 3C:
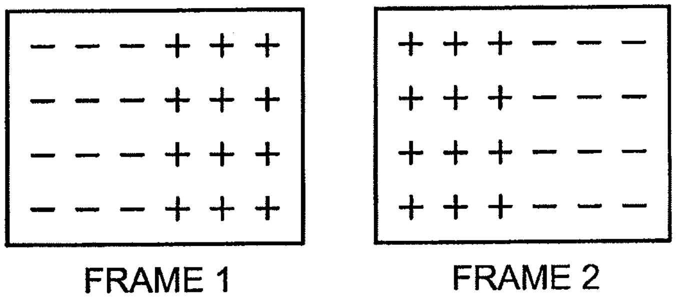
FIG. 3C illustrates an example three-column inversion scheme according to embodiments of the disclosure.
Figure 8A:
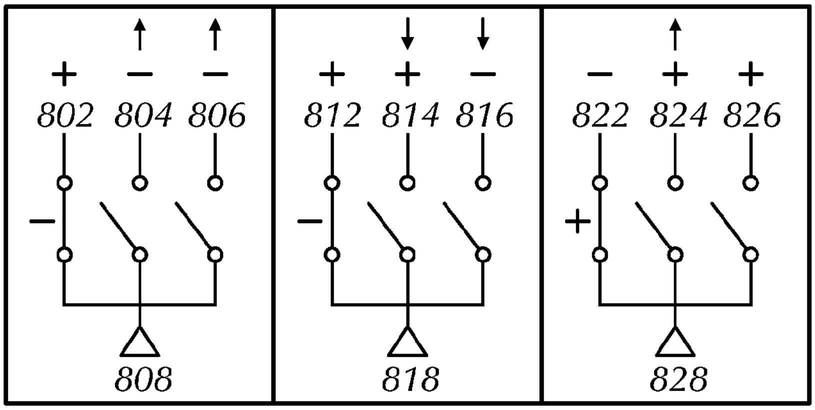
FIGS. 8A, 8B, and 8C illustrate an example voltage polarity pattern in a two-column inversion scheme according to embodiments of the disclosure.
Figure 8B:
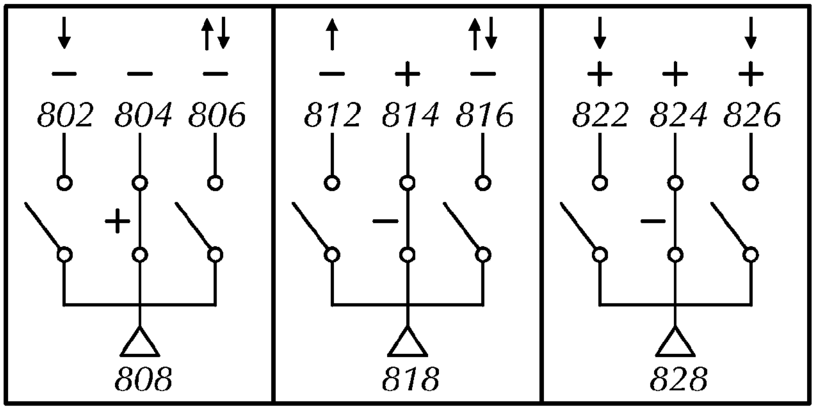
Figure 8C:
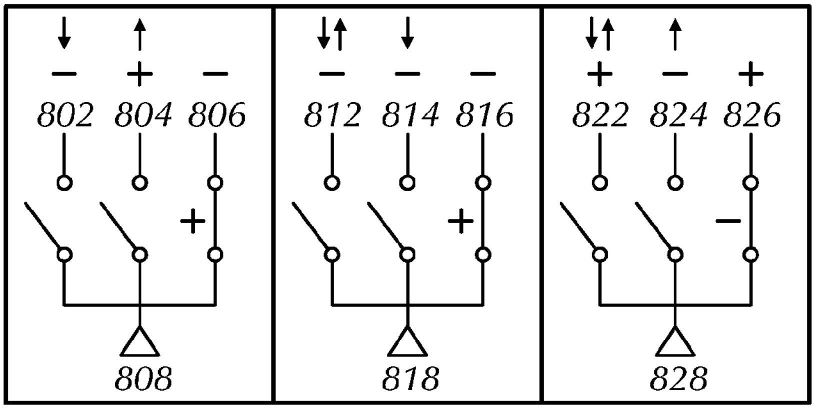

As illustrated in FIG. 3B, in a two-column inversion scheme, groups of two adjacent columns have the same polarity. This polarity alternates from group to group. FIGS. 8A, 8B, and 8C illustrate an example alternating voltage polarity pattern across a scanned row in one embodiment of a two-column inversion scheme. FIGS. 8A, 8B, and 8C illustrate an example embodiment in which a particular selection of write sequence can be combined with a particular selection of inversion scheme such that an offsetting brightening and darkening can be made to occur in each of one or more sub-pixels. In other words, some of the-sub-pixels can be affected by both a brightening and a darkening during the scanning of a line. In this way, for example, the effect of the brightening can be offset by the effect of the darkening (or vice versa) within the same sub-pixel. This effect can be referred to herein as a single sub-pixel offsetting, which can reduce or eliminate the appearance of a visual artifact in the sub-pixel. FIGS. 8A, 8B, and 8C also illustrate that a particular write sequence and inversion scheme combination can allow for multiple sub-pixel offsetting, in which sub-pixels of the same color are brightened in one pixel and darkened in an adjacent pixel. In this way, for example, the appearance of a visual artifact can be reduced or eliminated due to opposing errors in brightness being made to occur in sub-pixels in adjacent pixels.

FIGS. 8A, 8B, and 8C illustrate three adjacent pixels 800, 810, and 820 along the same row at different points in time, T0, T1, and T2, during a scan of the row. Pixel 800 has a red sub-pixel with red data line 802, a green sub-pixel with green data line 804, and a blue sub-pixel with blue data line 806. Above each sub-pixel's data line is a "+" or "−" sign. These signs show the prior voltage polarity on the data line from the previous update. The "+" or "−" sign next to the closed switch represents the polarity of the voltage being applied to the data line. A demultiplexer 808 located in the border region of the display can receive the RGB data signals for each sub-pixel and feed each signal to the appropriate RGB data line at the appropriate timing as dictated by timing and control circuitry (not shown), for example, as described above. Pixels 810 and 820 have a similar structure as pixel 810. The embodiment shown in FIGS. 8A, 8B, and 8C uses an RGB write sequence for each sub-pixel.

FIG. 8A, for example, illustrates the writing of data to the red sub-pixels by application of a voltage to red data lines 802, 812, and 822 at time T0. As illustrated, demultiplexers 808, 818, and 828 can apply a voltage to the red data lines. Doing so can change the polarity of the voltage on red data line 802 from + to −, the polarity of the voltage on red data line 812 from + to −, and the polarity of the voltage on red data line 822 from − to +. While a voltage is being applied to the red data lines, the green and blue data lines are floating. Accordingly, the large voltage changes on the red data lines can affect the voltages on the floating data lines as described below.

With respect to red data line 802, the negative change in voltage can increase the magnitude of the negative voltage on green data line 804, which can cause the corresponding green sub-pixel to appear brighter. This brightening effect is represented by the upward pointing arrow above green data line 804. The impact on non-adjacent blue data line 806 can be ignored.

With respect to red data line 812, the negative change in voltage on the red data line can affect the voltage on green data line 814 and blue data line 806 in adjacent pixel 800. The negative change in voltage on red data line 812 can decrease the magnitude of the positive voltage on green data line 814, which can cause the corresponding green sub-pixel to appear darker as represented by the downward pointing arrow above green data line 814. The negative change in voltage on red data line 812 can increase the magnitude of the negative voltage on blue data line 806, which can cause the corresponding blue sub-pixel to appear brighter as represented by the upward pointing arrow above blue data line 806.

With respect to red data line 822, the positive change in voltage on the red data line can affect the voltage on green data line 824 and blue data line 816 in adjacent pixel 810. The positive change in voltage on red data line 822 can increase the magnitude of the positive voltage on green data line 824, which can cause the corresponding green sub-pixel to appear brighter as represented by the upward pointing arrow above green data line 824. The positive change in voltage on red data line 822 can reduce the magnitude of the negative voltage on blue data line 816, which can cause the corresponding blue sub-pixel to appear darker as represented by the downward pointing arrow above blue data line 816.

FIG. 8B illustrates the writing of data to the green sub-pixels by application of a voltage to green data lines 804, 814, and 824 at time T1. Doing so can change the polarity of the voltage on green data line 804 from − to +, the polarity of the voltage on green data line 814 from + to −, and the polarity of the voltage on green data line 824 from + to −. The application of voltages to green data lines 804, 814, and 824 can overwrite any changes in voltage that occurred on the green data lines before time T1. This overwriting is represented by the absence of the arrows above green data lines 804, 814, and 824.

The large changes in voltage on the green data lines can affect the voltages on the red and blue data lines, for example, due to capacitive coupling between data lines. In this example, the large positive voltage change on green data line 804 can swing the voltage polarity from − to +. This positive voltage change can cause a positive voltage change in red data line 802. Because the polarity of the voltage on red data line 802 is negative, the positive voltage change on green data line

804 can reduce the magnitude of the voltage on red data line 802, which can make the corresponding red sub-pixel appear darker as represented by the downward pointing arrow above red data line 802. In a similar fashion, the large positive change in voltage on green data line 804 can reduce the magnitude of the negative voltage on blue data line 806, which can make the corresponding blue sub-pixel appear darker as represented by the downward pointing arrow above blue data line 806. Blue data line 806 also has an upward pointing arrow because the corresponding blue sub-pixel can brighten at time T0.

Likewise, the large change in voltage on green data line 814 can change the voltage on red data line 812 and blue data line 816. In this example, the large negative change in voltage on green data line 814 can increase the magnitude of the negative voltages on red data line 812 and blue data line 816, which can make the corresponding red and blue sub-pixels appear brighter as represented by the upward pointing arrows above red data line 812 and blue data line 816. Blue data line 816 also has a downward pointing arrow because the corresponding blue sub-pixel can darken at time T0.

In a similar manner, the large negative change in voltage on green data line 824 can decrease the magnitude of the positive voltages on red data line 822 and blue data line 826, which can cause the corresponding red and blue sub-pixels to appear darker as represented by the downward pointing arrows above red data line 822 and blue data line 826.

FIG. 8C illustrates the writing of data to the blue sub-pixels by application of a voltage to blue data lines 806, 816, and 826. Doing so can change the polarity of the voltages on the blue data lines from – to + on data line 806, from – to + on data line 816, and from + to – on data line 826. The application of voltages to blue data lines 806, 816, and 826 can overwrite any changes in voltage that occurred on the blue data lines before time T2. This overwriting is represented by the absence of the arrows above blue data lines 806, 816, and 826.

With respect to blue data line 806, the large positive change in voltage can affect the voltage on green data line 804 and red data line 812 in adjacent pixel 810. This positive change in voltage can increase the magnitude of the positive voltage on green data line 804, which can cause the corresponding green sub-pixel to appear brighter as represented by the upward pointing arrow above green data line 804. As for red data line 812, the positive change in voltage on blue data line 806 can reduce the magnitude of the negative voltage on the red data line, which can make the corresponding red sub-pixel appear darker as represented by the downward pointing arrow above red data line 812. An upward pointing arrow also appears above red data line 812 because the corresponding red sub-pixel can brighten at time T1.

In a similar fashion, the large positive change in voltage on blue data line 816 can affect the voltage on green data line 814 and red data line 822 in adjacent pixel 820. With respect to green data line 814, the positive change in voltage on blue data line 816 can decrease the magnitude of the negative voltage on green data line 814, which can make the green sub-pixel appear darker as represented by the downward pointing arrow above green data line 814. The large positive change in voltage on blue data line 816 can also cause the sub-pixel corresponding to red data line 822 to appear brighter as represented by the upward pointing arrow above red data line 822. A downward pointing arrow also appears above red data line 822 because the corresponding red sub-pixel can darken at time T1.

With respect to blue data line 826, the large negative change in voltage can increase the magnitude of the negative voltage on green data line 824, which can make the corresponding green sub-pixel appear brighter. This brightening effect is represented by the upward pointing arrow above green data line 824.

In this embodiment, FIG. 8C represents the end of the scan of the row. As such, any errors in luminance on the sub-pixel can persist until the next frame. These errors are represented by the arrows above the data lines. However, not all of these errors will be detectable. As seen in this example embodiment, the particular combination of the RGB write sequence with the two-column inversion scheme can allow offsetting of brightening and darkening to occur, such that some visual artifacts may not persist long enough to be perceptible.

Offsetting can occur in two forms, single sub-pixel offsetting and multiple sub-pixel offsetting. Single sub-pixel offsetting can occur when a sub-pixel brightens and then darkens during the scan of the line. Single sub-pixel offsetting can also apply when a sub-pixel darkens and then brightens during the scan of the line. The brightening and darkening effects in the sub-pixel can offset each other. As a consequence of this offset, the change in luminance on the sub-pixel may not be detectable.

In contrast, multiple sub-pixel offsetting can occur when one sub-pixel (e.g., green sub-pixel in pixel 810) brightens and a like colored sub-pixel in an adjacent pixel (e.g., green sub-pixel in pixel 820) darkens. Because data is written to the sub-pixels in a write sequence in a rapid manner, the brightening and darkening of like colored sub-pixels can offset each other and render the change in luminance undetectable.

FIG. 8C illustrates an example of single sub-pixel offsetting in the sub-pixels corresponding to red data lines 802, 812, and 822. These effects will be first described with respect to red data lines 812 and 822.

Single sub-pixel offsetting can occur when a sub-pixel brightens and darkens. As illustrated in FIG. 8C, the sub-pixel corresponding to red data line 812 can both brighten and darken as represented by the upward and downward pointing arrows above red data line 812. The brightening effect can occur when the voltage on green data line 814 changes at time T1. The darkening effect can occur when the voltage on blue data line 806 changes at time T2. The brightening and darkening of the red sub-pixel can offset each other and render any errors in luminance undetectable.

In a similar fashion, the visual artifacts on the sub-pixel corresponding to red data line 822 may not be perceptible. As illustrated by the upward and downward pointing arrows above red data line 822 in FIG. 8C, the sub-pixel corresponding to red data line 822 can both brighten and darken. The darkening effect can occur when the voltage on green data line 824 changes at time T1. The brightening effect can occur when the voltage on blue data line 816 changes at time T2. These brightening and darkening effects can offset each other.

Single sub-pixel offsetting can also apply to the sub-pixel corresponding to red data line 802. Although only a single downward pointing arrow appears above red data line 802, a person of ordinary skill in the art would recognize that a change in voltage on a blue data line (not shown) to the left of red data line 802 can cause the corresponding red sub-pixel to brighten at time T2. Accordingly, the darkening and brightening of the red sub-pixel can offset each other.

FIG. 8C also illustrates an example of multiple sub-pixel offsetting in the sub-pixels corresponding to green data lines 804, 814, and 824. Multiple sub-pixel offsetting can occur when like colored sub-pixels in adjacent pixels brighten and darken. As illustrated by the upward and downward pointing arrows in FIG. 8C, the sub-pixel corresponding to green data line 814 can darken as the sub-pixel corresponding to green data line 824 can brighten. The darkening and brightening of the green colored sub-pixels can offset each other and render the errors in luminance undetectable. In a similar fashion, the sub-pixel corresponding to green data line 804 can brighten and, as one of ordinary skill in the art would recognize, a green sub-pixel in an adjacent pixel to the left of green data line 804 can darken.

Figure 9A:
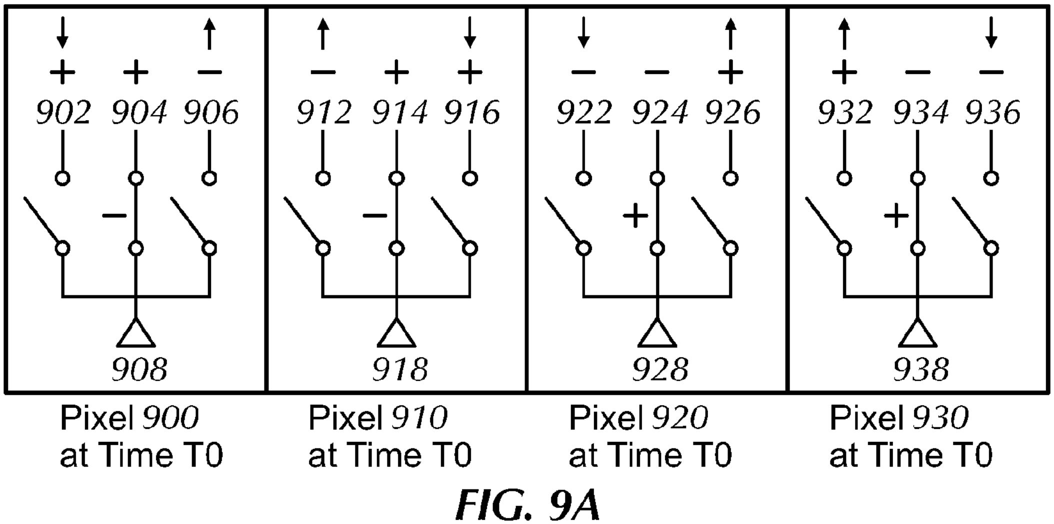
FIGS. 9A, 9B, and 9C illustrate an example voltage polarity pattern in a two-column inversion scheme using different write sequences according to embodiments of the disclosure.
Figure 9B:
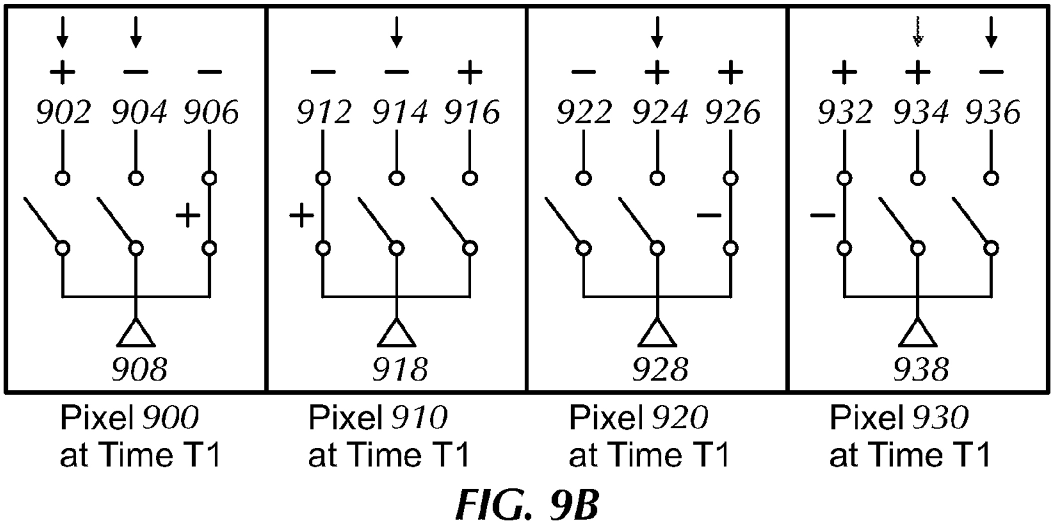
Figure 9C:
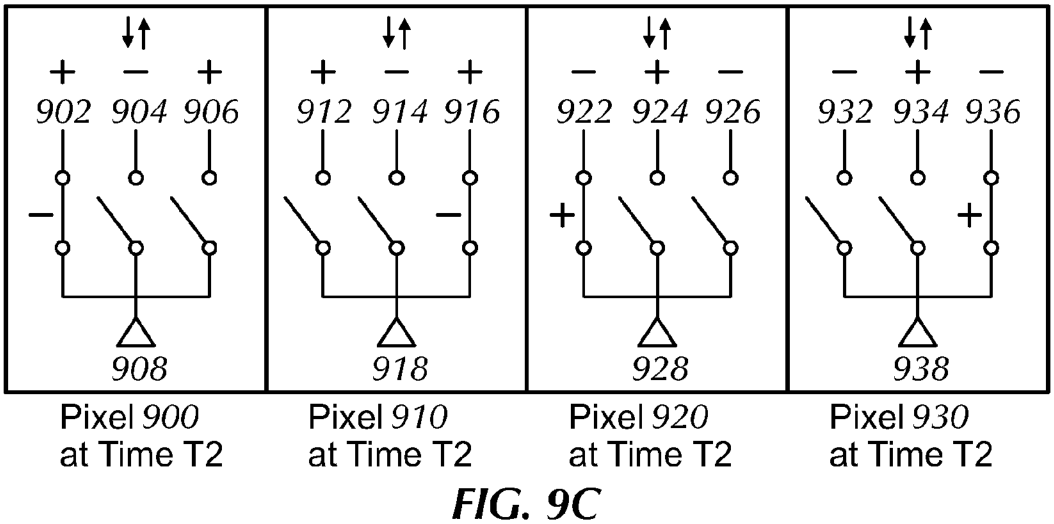

FIGS. 9A, 9B, and 9C illustrate an example embodiment in which two different write sequences, GBR and GRB, can be used during a scan of the row. As described above, charging a sub-pixel can require a large change in voltage on the sub-pixel's data line. This large change in voltage can affect the voltage on adjacent floating data lines, which can create visual artifacts on these floating data lines. In this example, using GBR and GRB write sequences in a two-column inversion scheme can reduce the presence of these visual artifacts because single sub-pixel offsetting can occur.

This example embodiment will be described with respect to the two-column inversion scheme and write sequence illustrated in FIGS. 9A, 9B, and 9C. These figures illustrate four adjacent pixels 900, 910, 920, and 930 along the same row at different points in time, T0, T1, and T2, during a scan of the row. Pixel 900 has a red sub-pixel with a red data line 902, a green sub-pixel with a green data line 904, and a blue sub-pixel with a blue data line 906. A demultiplexer 908 located in the border region of the display can operate the data lines of pixel 900. Pixels 910, 920, and 930 have a similar structure as pixel 900.

As illustrated in FIG. 9A, a voltage can be applied to green data lines 904, 914, 924, and 934 at time T0. With respect to green data line 904, for example, the application of a negative voltage can swing the voltage polarity from positive to negative. This large negative change in voltage can affect the voltage on red data line 902 and blue data line 906. With respect to red data line 902, the large negative change in voltage on green data line 904 can decrease the magnitude of the positive voltage on red data line 902, which can cause the corresponding red sub-pixel to appear darker as represented by the downward pointing arrow above red data line 902. The large negative change in voltage on green data line 904 can increase the magnitude of the negative voltage on blue data line 906, which can cause the corresponding blue sub-pixel to appear brighter as represented by the upward pointing arrow above blue data line 906. In a similar fashion, the change in voltage on the other green data lines can affect the voltage on their adjacent red and blue data lines, which can cause these data lines to brighten or darken in accordance with the illustrated arrows.

FIG. 9B illustrates the application of voltage to blue data line 906 in pixel 900, the application of voltage to red data line 912 in pixel 910, the application of voltage to blue data line 926 in pixel 920, and the application of voltage to red data line 932 in pixel 930. The changes in voltage on blue data line 906 and red data line 912 will be described first.

With respect to blue data line 906 and red data line 912, the application of positive voltages to both data lines can change the polarity of the voltage on both data lines from negative to positive. The application of voltages to blue data line 906 and red data line 912 can overwrite any changes in voltage that occurred on these data lines before time T1. This overwriting is represented by the absence of arrows above blue data line 906 and red data line 912.

The large positive change in voltage on blue data line 906 can affect the voltage on green data line 904. In this example, the large positive change in voltage on blue data line 906 can reduce the magnitude of the negative voltage on green data line 904, which can cause the corresponding green sub-pixel to darken as represented by the downward pointing arrow above green data line 904.

The large change in voltage on blue data line 906, however, should have a minimal effect on the voltage on red data line 912. Because a voltage is applied to both of these data lines at time T1, both blue data line 906 and red data line 912 can be connected to different voltage sources. As such, the change in voltage on blue data line 906 should have a minimal effect on the voltage on red data line 912 and vice versa. In this way, the write sequences can be constructed such that the writing of data to adjacent sub-pixels in adjacent pixels can produce minimal visual artifacts in the sub-pixels.

Although the large positive change in voltage on red data line 912 should have a minimal effect on the voltage on blue data line 906, this change in voltage can affect the voltage on green data line 914. In this example, the large positive change in voltage on red data line 912 can reduce the magnitude of the negative voltage on green data line 914, which can cause the corresponding green sub-pixel to appear darker as represented by the downward pointing arrow above green data line 914.

The changes in voltage on blue data line 926 and red data line 932 will be described next. At time T1, negative voltages are applied to both data lines. These applications of voltage can overwrite any changes in voltage that occurred on these data lines before time T1. This overwriting is represented by the absence of arrows above blue data line 926 and red data line 932.

The change in voltage on blue data line 926 can affect the voltage on green data line 924. In this example, the negative change in voltage on blue data line 926 can reduce the magnitude of the positive voltage on green data line 924, which can cause the corresponding green sub-pixel to darken as represented by the downward pointing arrow above green data line 924.

Similar to blue data line 906, the change in voltage on blue data line 926 should have a minimal effect on the voltage on its adjacent red data line (i.e., red data line 932). Because a voltage is applied to blue data line 926 and red data line 932 at time T1, both blue data line 926 and red data line 932 can be connected to different voltage sources at time T1. As such, the change in voltage on one data line will not affect the voltage on the other data line.

The change in voltage on red data line 932, however, can affect the voltage on green data line 934. Here, the negative change in voltage on red data line 932 can reduce the magnitude of the positive voltage on green data line 934, which can cause the corresponding green sub-pixel to appear darker as represented by the downward pointing arrow above green data line 934.

Referring now to FIG. 9C, negative voltages can be applied to red data line 902 and blue data line 916, and positive voltages can be applied to red data line 922 and blue data line 936. The application of voltages to red data lines 902 and 922 and blue data line 916 and 936 can overwrite any changes in voltage that occurred on these data lines before time T2. This overwriting is represented by the absence of arrows above these data lines.

With respect to red data line 902, the application of a negative voltage can affect the voltage on green data line 904. In this example, the negative change in voltage on red data line 902 can increase the magnitude of the negative voltage on green data line 904, which can cause the corresponding green sub-pixel to appear brighter as represented by the upward pointing arrow above green data line 904. However, green data line 904 also has a downward pointing arrow because the corresponding green sub-pixel can darken at time T1. Single sub-pixel offsetting can occur in this green sub-pixel because the green sub-pixel can both brighten and darken. In this way, the write sequence for this pixel can be constructed such that the last application of voltage can offset any persisting visual artifacts in the pixel.

In a similar manner, the visual artifacts on the sub-pixel corresponding to green data line 914 can be offset when a negative voltage is applied to blue data line 916 in pixel 920. This offset is represented by the upward and downward pointing arrows above green data line 914.

The negative change in voltage on blue data line 916, however, should have a minimal effect on the voltage on red data line 922 in adjacent pixel 920. Because voltages are applied blue data line 916 and red data line 922 at time T2, both data lines are connected to different voltage sources. As such, the change in voltage on one data line should have a minimal effect on the voltage on the other data line.

Single sub-pixel offsetting can also occur in the green sub-pixels corresponding to green data lines 924 and 934. With respect to pixel 920, the positive change in voltage on red data line 922 can increase the magnitude of the voltage on green data line 924, which can cause the corresponding green sub-pixel to appear brighter as represented by the upward pointing arrow above green data line 924. However, a downward pointing arrow also appears above green data line 924 as the corresponding green sub-pixel can darken at time T1. The brightening and darkening of the green sub-pixel can offset each other. The green sub-pixel corresponding to data line 934 can be affected in a similar manner.

As described above with respect to FIGS. 9A, 9B, and 9C, the use of GBR and GRB write sequences can yield minimal visual artifacts in some sub-pixels in which data is concurrently written to adjacent sub-pixels in adjacent pixels. Moreover, the use of GBR and GRB write sequences can reduce the presence of any remaining visual artifacts in the pixel due to the effects of single sub-pixel offsetting. In this example embodiment, a pattern of GBR and GRB write sequences in the row of pixels can be a repeating pattern of alternating one pixel sequenced with GBR and an adjacent pixel sequenced with GRB. For example, pixel 900 can use a GBR write sequence, and pixel 910 can use a GRB write sequence. This pattern of GBR and GRB write sequences can be repeated in pixels 920 and 930, respectively.

Although the above embodiment is described in relation to GBR and GRB write sequences in a two-column inversion scheme, a person of ordinary skill in the art would recognize that other write strategies may similarly reduce or eliminate visual artifacts by applying two or more different write sequences in other inversion schemes.

In another example embodiment, different write sequences can be used to reduce or eliminate any errors in luminance by spreading visual artifacts among different types of sub-pixels. For example, by distributing artifacts to all three colors of sub-pixels, no single color (i.e., red, green, or blue) can appear brighter or darker than the other. For example, visual artifacts can be less noticeable if all red, green, and blue sub-pixels appear brighter or darker together, than if only red sub-pixels were affected.

Figure 10A:
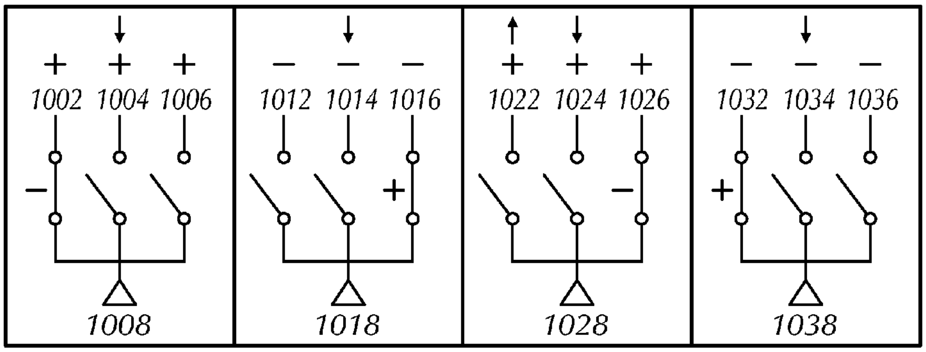
FIGS. 10A, 10B, and 10C illustrate an example voltage polarity pattern in a three-column inversion scheme using different write sequences according to embodiments of the disclosure.
Figure 10B:
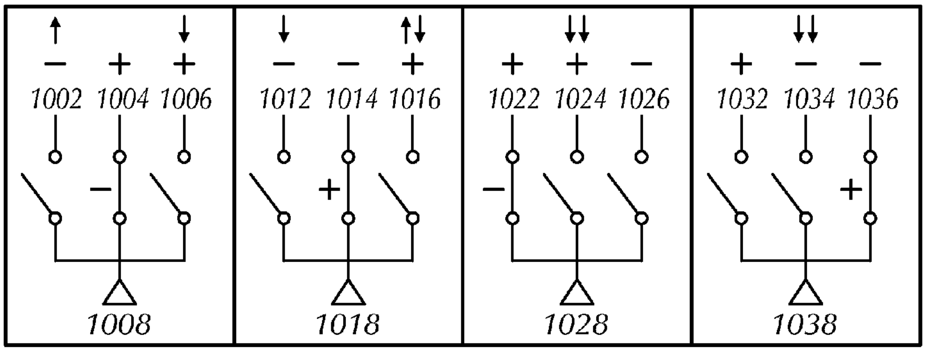
Figure 10C:
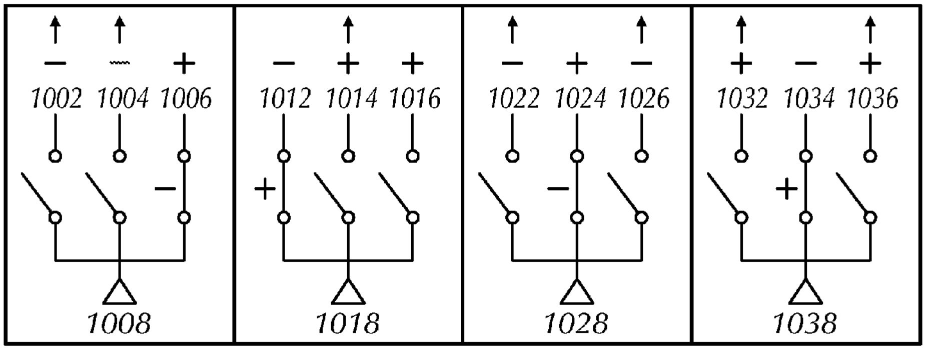

This example embodiment will be described with respect to the three-column inversion scheme and four different write sequences illustrated in FIGS. 10A, 10B, and 10C. These figures illustrate four adjacent pixels 1000, 1010, 1020, and 1030 along the same row at different points in time, T0, T1, and T2, during a scan of the row. Pixel 1000 has a red sub-pixel with a red data line 1002, a green sub-pixel with a green data line 1004, and a blue sub-pixel with a blue data line 1006. A demultiplexer 1008 located in the border region of the display can operate the data lines of pixel 1000. Pixels 1010, 1020, and 1030 have a similar structure as pixel 1000. As illustrated in FIGS. 10A, 10B, and 10C, pixels 1000, 1010, 1020, and 1030 use RGB, BGR, BRG, and RBG write sequences, respectively.

FIGS. 10A, 10B, and 10C show the applications of voltage to the data lines for each write sequence, as one of ordinary skill in the art would understand in light of the disclosure herein. As in previous figures, the brightenings and darkenings resulting from the various applications of voltage to the data lines are represented by the upward and downward pointing arrows above the data lines.

In this example embodiment, FIG. 10C can correspond to the last application of voltage during the update of the row of pixels. As such, the visual artifacts represented by the upward pointing arrows in FIG. 10C can persist until this row of pixels is updated again in the next frame. Here, brightening artifacts can appear on the sub-pixels corresponding to red data line 1002, green data line 1004, green data line 1014, red data line 1022, blue data line 1026, red data line 1032, and blue data line 1036. In other words, in the group of four adjacent pixels shown in FIG. 10C, brightening artifacts can appear in three red sub-pixels, two green sub-pixels, and two blue sub-pixels. As such, using the RGB, BGR, BRG, and RBG write sequence can spread visual artifacts among all three colored sub-pixels. In contrast, if a single RGB write sequence were used for each pixel, instead of the four different write sequences in this example embodiment, brightening visual artifacts would appear on all of the green sub-pixels in the row, and minimal visual artifacts would appear on red or blue sub-pixels. By spreading the brightening error in luminance to all three colored sub-pixels in this example embodiment, the visual artifacts can appear less noticeable.

Figure 11:
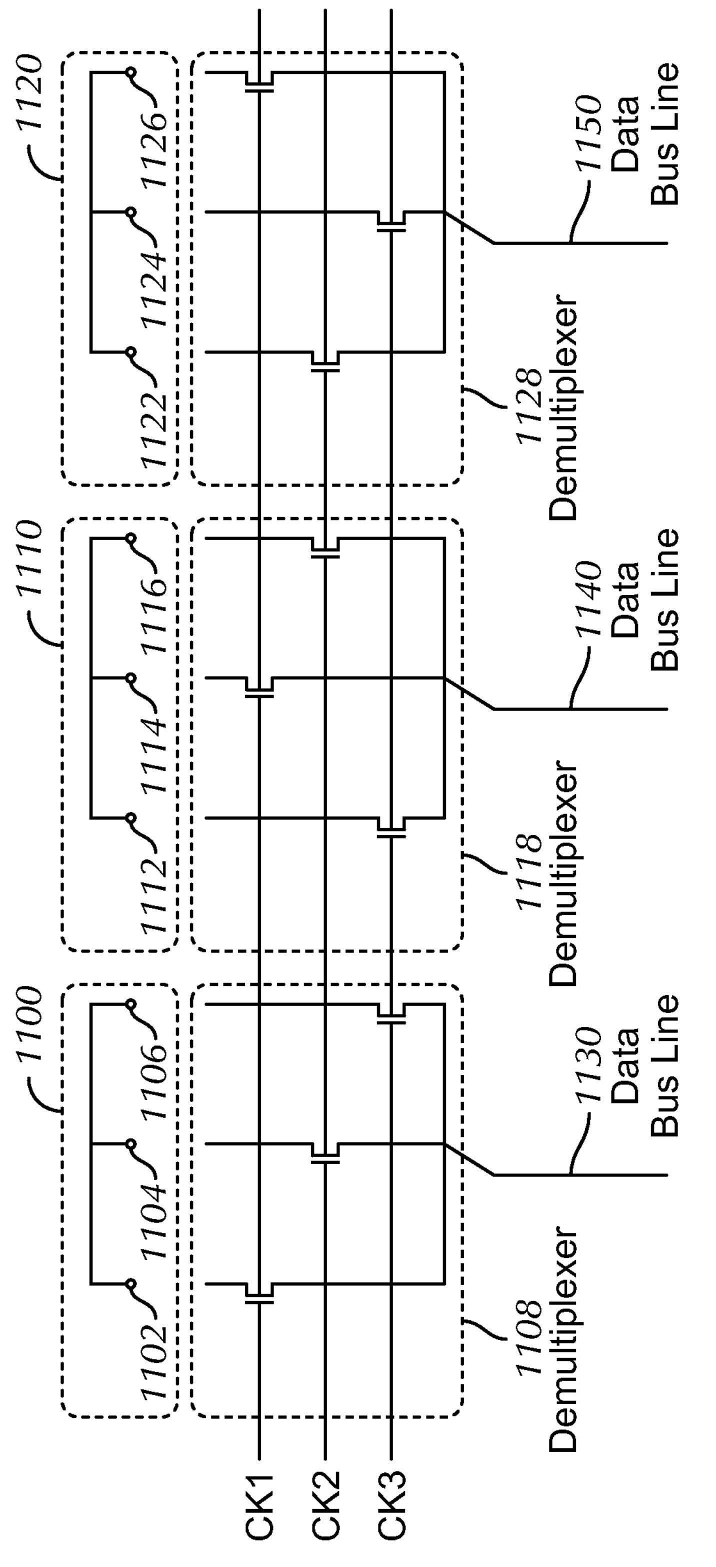
FIG. 11 illustrates an example circuit diagram for applying voltages to data lines using different write sequences according to embodiments of the disclosure.

FIG. 11 illustrates circuit diagram of a portion of an example demultiplexing system including three demultiplexers 1108, 1118, and 1128 according to embodiments of the disclosure. In this example embodiment, the demultiplexers can be controlled to apply three different write sequences, RGB, GBR, and BRG. Each demultiplexer can be connected to one of three pixels 1100, 1110, and 1120. Pixel 1100 has a red data line 1102, a green data line 1104, and a blue data line 1106. Pixels 1110 and 1120 have a similar structure as pixel 1100.

In order to write data to the pixels, a display driver (not shown) can apply different voltages from different voltage sources (not shown) to demultiplexers 1108, 1118, and 1128 via data bus lines 1130, 1140, and 1150. The display driver can transmit three clock signals, CK1, CK2, and CK3, to the demultiplexers, such that each demultiplexer can apply the appropriate voltage to the appropriate data line in accordance with the write sequence for the demultiplexer's pixel. The write sequence illustrated in FIG. 11, for example, can use a RGB, GBR, BRG write sequence for pixels 1100, 1110, and 1120, respectively.

For example, when the first clock signal CK1 is transmitted, the voltage applied to data bus line 1130 can be the target voltage for the red sub-pixel of pixel 1100, such that demultiplexer 1108 can apply the target red voltage to red data line 1102 in pixel 1100. Likewise, the voltage applied to data bus lines 1140 and 1150 during CK1 can be the target voltages for the green sub-pixel of pixel 1110 and the blue sub-pixel of pixel 1120, respectively, such that demultiplexer 1118 can apply the target green voltage to green data line 1114 in pixel 1110, and demultiplexer 1128 can apply the target blue voltage to blue data line 1126 in pixel 1120.

In a similar fashion, when the second clock signal CK2 is transmitted, demultiplexer 1108 can apply a voltage to green data line 1104 in pixel 1100; demultiplexer 1118 can apply a voltage to blue data line 1116 in pixel 1110; and demultiplexer 1128 can apply a voltage to red data line 1122 in pixel 1120.

Finally, when the third clock signal CK3 is transmitted, demultiplexer 1108 can apply a voltage to blue data line 1106 in pixel 1100; demultiplexer 1118 can apply a voltage to red data line 1112 in pixel 1110; and demultiplexer 1128 can apply a voltage to green data line 1124 in pixel 1120.

In the above example embodiment, a single clock signal can be used to control a set of demultiplexers to apply voltages to different types of sub-pixels (e.g., red, green, and blue sub-pixels) in different pixels. In this way, for example, only three clock signals may be required to control a system of demultiplexers to apply three different write sequences.

One or more of the functions of the above embodiments including, for example, the additional voltage applications and overdriving processes can be performed by computer-executable instructions, such as software/firmware, residing in a medium, such as a memory, that can be executed by a processor, as one skilled in the art would understand. The software/firmware can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any physical medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like. In the context of this document, a "non-transitory computer-readable storage medium" does not include signals.

Figure 12:
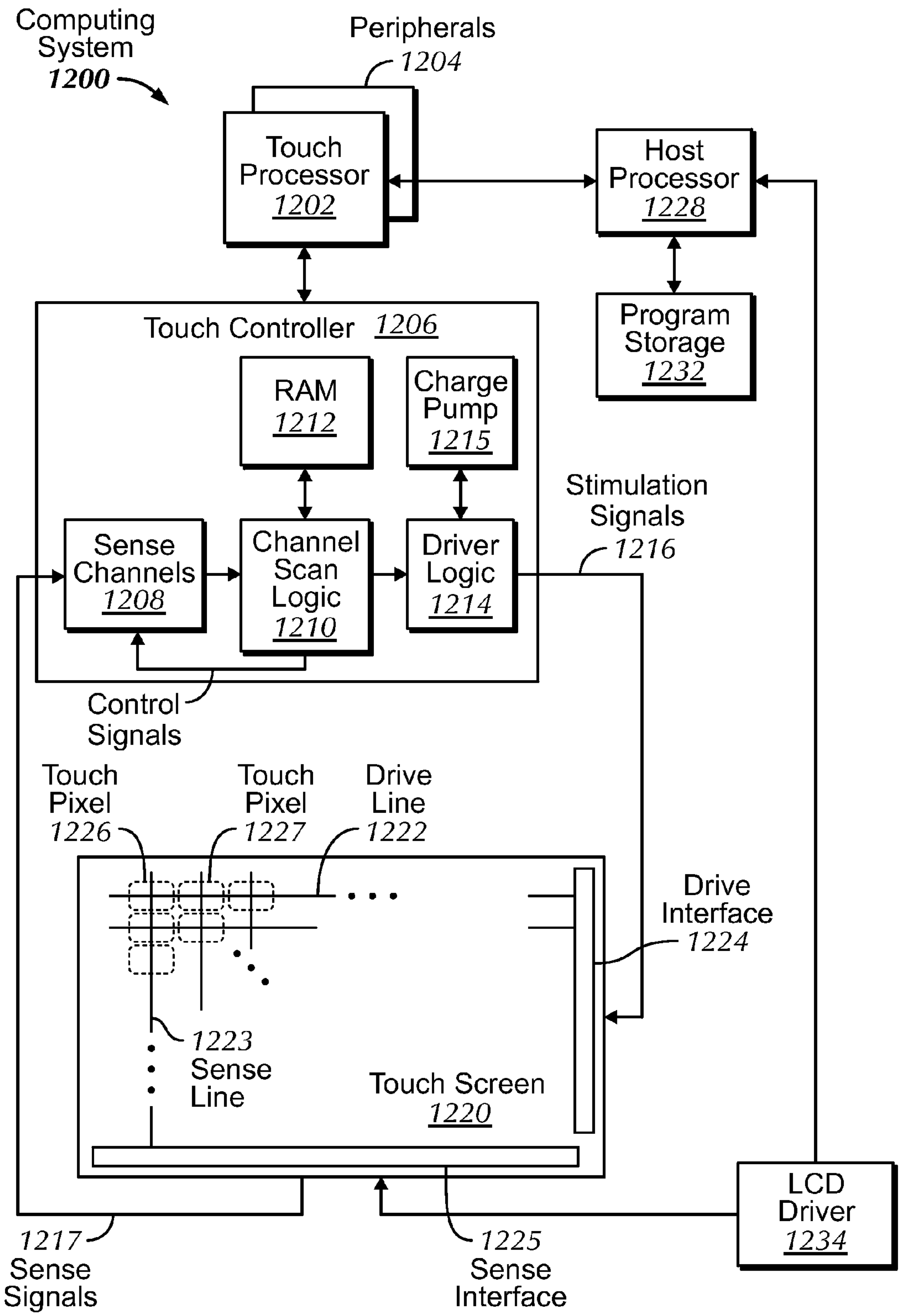
FIG. 12 is a block diagram of an example computing system that illustrates one implementation of an example display screen according to embodiments of the disclosure.

FIG. 12 is a block diagram of an example computing system 1200 that illustrates one implementation of an example display screen according to embodiments of the disclosure. In the example of FIG. 12, the computing system is a touch sensing system 1200 and the display screen is a touch screen 1220, although it should be understood that the touch sensing system is merely one example of a computing system, and that the touch screen is merely one example of a type of display screen. Computing system 1200 could be included in, for example, mobile telephone 136, digital media player 140, personal computer 144, or any mobile or non-mobile computing device that includes a touch screen. Computing system 1200 can include a touch sensing system including one or more touch processors 1202, peripherals 1204, a touch controller 1206, and touch sensing circuitry (described in more detail below). Peripherals 1204 can include, but are not limited to, random access memory (RAM) or other types of memory or non-transitory computer-readable storage media capable of storing program instructions executable by the touch processor 1202, watchdog timers and the like. Touch controller 1206 can include, but is not limited to, one or more sense channels 1208, channel scan logic 1210 and driver logic 1214. Channel scan logic 1210 can access RAM 1212, autonomously read data from the sense channels and provide control for the sense channels. In addition, channel scan logic 1210 can control driver logic 1214 to generate stimulation signals 1216 at various frequencies and phases that can be selectively applied to drive regions of the touch sensing circuitry of touch screen 1220. In some embodiments, touch controller 1206, touch processor 1202 and peripherals 1204 can be integrated into a single application specific integrated circuit (ASIC). A processor, such as touch processor 1202, executing instructions stored in non-transitory computer-readable storage media found in peripherals 1204 or RAM 1212, can control touch sensing and processing, for example.

Computing system 1200 can also include a host processor 1228 for receiving outputs from touch processor 1202 and performing actions based on the outputs. For example, host processor 1228 can be connected to program storage 1232 and a display controller, such as an LCD driver 1234. Host processor 1228 can use LCD driver 1234 to generate an image on touch screen 1220, such as an image of a user interface (UI), by executing instructions stored in non-transitory computer-readable storage media found in program storage 1232, for example, to control the demultiplexers, voltage levels and the timing of the application of voltages as described above to apply different write sequences to write data to a row of sub-pixels in a display screen during an update of the sub-pixels' row, although in other embodiments the touch processor 1202, touch controller 1206, or host processor 1228 may independently or cooperatively control the demultiplexers, voltage levels and the timing of the application of voltages. Host processor 1228 can use touch processor 1202 and touch controller 1206 to detect and process a touch on or near touch screen 1220, such a touch input to the displayed UI. The touch input can be used by computer programs stored in program storage 1232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1228 can also perform additional functions that may not be related to touch processing.

Touch screen 1220 can include touch sensing circuitry that can include a capacitive sensing medium having a plurality of drive lines 1222 and a plurality of sense lines 1223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 1222 can be driven by stimulation signals 1216 from driver logic 1214 through a drive interface 1224, and resulting sense signals 1217 generated in sense lines 1223 can be transmitted through a sense interface 1225 to sense channels 1208 (also referred to as an event detection and demodulation circuit) in touch controller 1206. In this way, drive lines and sense lines can be part of the touch sensing circuitry that can interact to form capacitive sensing nodes, which can be thought of as touch picture elements (touch pixels), such as touch pixels 1226 and 1227. This way of understanding can be particularly useful when touch screen 1220 is viewed as capturing an "image" of touch. In other words, after touch controller 1206 has determined whether a touch has been detected at each touch pixel in the touch screen, the pattern of touch pixels in the touch screen at which a touch occurred can be thought of as an "image" of touch (e.g. a pattern of fingers touching the touch screen).

In some example embodiments, touch screen 1220 can be an integrated touch screen in which touch sensing circuit elements of the touch sensing system can be integrated into the display pixels stackups of a display.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A method of scanning a display, the display including a plurality of display pixels that are each associated with a set of a plurality of data lines, comprising:

electrically connecting each display pixel in a line of the display pixels to the associated set of data lines during an update of the line of display pixels, the line of display pixels including a first display pixel associated with a first set of data lines and a second display pixel associated with a second set of data lines;

sequentially applying voltages to the first set of data lines in a first sub-pixel color order write sequence of a plurality of write sequences of the data lines during the update of the line of display pixels; and sequentially applying voltages to the second set of data lines in a second sub-pixel color order write sequence of the plurality of write sequences of the data lines, different than the first write sequence, during the update of the line of display pixels, and wherein the plurality of write sequences result in, after application of voltages to all of the plurality of display pixels in the display, each sub-pixel of the display, if shifted due to application of the voltages to adjacent sub-pixels during a corresponding write sequence of the plurality of write sequences, being shifted only in one direction common to all shifted sub-pixels.

2. The method of claim 1, wherein each set of data lines includes a left data line, a center data line, and a right data line.

3. The method of claim 2, wherein sequentially applying voltages to the first set includes applying a first voltage to the center data line in the first set, and sequentially applying voltages to the second set includes applying a second voltage to the center data line in the second set, the second voltage being applied concurrently with the application of the first voltage.

4. The method of claim 3, wherein the left data line is a red data line, the center data line is a green data line, the right data line is a blue data line, the first write sequence is a green-blue-red write sequence, and the second write sequence is a green-red-blue write sequence.

5. The method of claim 1, wherein the first and second display pixels are adjacent, sequentially applying voltages to the first set includes applying a first voltage to a first data line in the first set, and sequentially applying voltages to the second set includes applying a second voltage to a second data line in the second set, the second voltage being applied concurrently with the application of the first voltage, and the first and second data lines being adjacent data lines.

6. The method of claim 1, wherein the first write sequence and second write sequence form a pattern that is repeated in adjacent pairs of display pixels.

7. The method of claim 1, wherein the first set includes a first data line, a second data line, and a third data line, the first data line being adjacent to each of the second and third data lines, and wherein sequentially applying voltages to the first set includes applying a first voltage to the first data line, applying a second voltage to the second data line such that a voltage value of the second data line changes from a positive polarity to a negative polarity, and applying a third voltage to the third data line such that a voltage value of the third data line changes from a negative polarity to a positive polarity, the application of the first voltage being prior to the application of each of the second and third voltages.

8. The method of claim 1, wherein the first set includes a first data line and a second data line, the first data line being adjacent to the second data line, the second set includes a third data line, the third data line being adjacent to the first data line, and wherein sequentially applying voltages to the first set includes applying a first voltage to the first data line, applying a second voltage to the second data line such that the polarity of a voltage value of the second data line changes, and sequentially applying voltages to the second set includes applying a third voltage to the third data line such that the polarity of a voltage value of the third data line changes, the application of the first voltage being prior to the application of each of the second and third voltages, the second voltage having a polarity that is opposite the polarity of the third voltage.

9. The method of claim 1, wherein the first and second display pixels are adjacent, the first set includes a first data line and a second data line, the first and second data lines being adjacent to each other, and the second set includes a third data line and a fourth data line, the third and fourth data lines being adjacent to each other, and wherein sequentially applying voltages to the first set includes applying a first voltage to the first data line, and applying a second voltage to the second data line after the application of the first voltage, the application of the second voltage changing the polarity of a voltage value of the second data line, the polarity of the second voltage being the same as the polarity of the first voltage, and sequentially applying voltages to the second set includes applying a third voltage to the third data line, and applying a fourth voltage to the fourth data line after the application of the third voltage, the application of the fourth voltage changing the polarity of a voltage value of the fourth data line, the polarity of the fourth voltage being opposite of the polarity of the third voltage.

10. The method of claim 1, wherein the line of display pixels further includes a third display pixel associated with a third set of data lines and a fourth display pixel associated with a fourth set of data lines, the method further comprising:

sequentially applying voltages to the third set of data lines in a third sub-pixel color order write sequence of the plurality of write sequences of the data lines during the update of the line of display pixels; and sequentially applying voltages to the fourth set of data lines in a fourth sub-pixel color order write sequence of the plurality of write sequences of the data lines, during the update of the line of display pixels, wherein the each of the first, second, third, and fourth write sequences are different from each other.

11. The method of claim 10, wherein each set of data lines includes a left data line, a center data line, and a right data line.

12. The method of claim 11, wherein the first write sequence is a red-green-blue write sequence, the second write sequence is a blue-green-red write sequence, the third write sequence is a blue-red-green write sequence, and the fourth write sequence is a red-blue-green write sequence.

13. A non-transitory computer-readable storage medium storing computer readable instructions that, when executed by a computing device, cause the device to perform a method of scanning a display, the display including a plurality of display pixels that are each associated with a set of a plurality of data lines, the method comprising:

electrically connecting each display pixel in a line of the display pixels to the associated set of data lines during an update of the line of display pixels, the line of display pixels including a first display pixel associated with a first set of data lines and a second display pixel associated with a second set of data lines;

sequentially applying voltages to the first set of data lines in a first sub-pixel color order write sequence of a plurality of write sequences of the data lines during the update of the line of display pixels; and sequentially applying voltages to the second set of data lines in a second sub-pixel color order write sequence of the plurality of write sequences of the data lines, different than the first write sequence, during the update of the line of display pixels, and wherein the plurality of write sequences result in, after application of voltages to all of the plurality of display pixels in the display, each sub-pixel of the display, if shifted due to application of the voltages to adjacent sub-pixels during a corresponding write sequence of the plurality of write sequences, being shifted only in one direction common to all shifted sub-pixels.

14. The non-transitory computer-readable storage medium of claim 13, wherein each set of data lines includes a left data line, a center data line, and a right data line, and wherein sequentially applying voltages to the first set includes applying a first voltage to the center data line in the first set, and sequentially applying voltages to the second set includes applying a second voltage to the center data line in the second set, the second voltage being applied concurrently with the application of the first voltage.

15. The non-transitory computer-readable storage medium of claim 13, wherein the first and second display pixels are adjacent, and sequentially applying voltages to the first set includes applying a first voltage to a first data line in the first set, and sequentially applying voltages to the second set includes applying a second voltage to a second data line in the second set, the second voltage being applied concurrently with the application of the first voltage, and the first and second data lines being adjacent data lines.

16. The non-transitory computer-readable storage medium of claim 13, wherein the first write sequence and second write sequence form a pattern that is repeated in adjacent pairs of display pixels.

17. The non-transitory computer-readable storage medium of claim 13, wherein the first set includes a first data line, a second data line, and a third data line, the first data line being adjacent to each of the second and third data lines, and wherein sequentially applying voltages to the first set includes applying a first voltage to the first data line, applying a second voltage to the second data line such that a voltage value of the second data line changes from a positive polarity to a negative polarity, and applying a third voltage to the third data line such that a voltage value of the third data line changes from a negative polarity to a positive polarity, the application of the first voltage being prior to the application of each of the second and third voltages.

18. The non-transitory computer-readable storage medium of claim 13, wherein the first set includes a first data line and a second data line, the first data line being adjacent to the second data line, the second set includes a third data line, the third data line being adjacent to the first data line, and wherein sequentially applying voltages to the first set includes applying a first voltage to the first data line, applying a second voltage to the second data line such that the polarity of a voltage value of the second data line changes, and sequentially applying voltages to the second set includes applying a third voltage to the third data line such that the polarity of a voltage value of the third data line changes, the application of the first voltage being prior to the application of each of the second and third voltages, the second voltage having a polarity that is opposite the polarity of the third voltage.

19. The non-transitory computer-readable storage medium of claim 13, wherein the first and second display pixels are adjacent, the first set includes a first data line and a second data line, the first and second data lines being adjacent to each other, and the second set includes a third data line and a fourth data line, the third and fourth data lines being adjacent to each other, and wherein:

sequentially applying voltages to the first set includes applying a first voltage to the first data line, and applying a second voltage to the second data line after the application of the first voltage, the application of the second voltage changing the polarity of a voltage value of the second data line, the polarity of the second voltage being the same as the polarity of the first voltage; and sequentially applying voltages to the second set includes applying a third voltage to the third data line, and applying a fourth voltage to the fourth data line after the application of the third voltage, the application of the fourth voltage changing the polarity of a voltage value of the fourth data line, the polarity of the fourth voltage being opposite of the polarity of the third voltage.

20. The non-transitory computer-readable storage medium of claim 13, wherein the line of display pixels further includes a third display pixel associated with a third set of data lines and a fourth display pixel associated with a fourth set of data lines, the method further comprising:

sequentially applying voltages to the third set of data lines in a third sub-pixel color order write sequence of the plurality of write sequences of the data lines during the update of the line of display pixels; and sequentially applying voltages to the fourth set of data lines in a fourth sub-pixel color order write sequence of the plurality of write sequences of the data lines, during the update of the line of display pixels, wherein the each of the first, second, third, and fourth write sequences are different from each other.

21. A display apparatus, comprising:

a display including a plurality of display pixels that are each associated with a set of a plurality of data lines; and a processor programmed for scanning the display by electrically connecting each display pixel in a line of the display pixels to the associated set of data lines during an update of the line of display pixels, the line of display pixels including a first display pixel associated with a first set of data lines and a second display pixel associated with a second set of data lines, sequentially applying voltages to the first set of data lines in a first sub-pixel color order write sequence of a plurality of write sequences of the data lines during the update of the line of display pixels, and sequentially applying voltages to the second set of data lines in a second sub-pixel color order write sequence of the plurality of write sequences of the data lines, different than the first write sequence, during the update of the line of display pixels, and wherein the plurality of write sequences result in, after updating every data line of plurality of data lines in the display, each sub-pixel of the display, if shifted due to the update of adjacent sub-pixels in a data line of the plurality of data lines during a corresponding write sequence of the plurality of write sequences, being shifted only in one direction common to all shifted sub-pixels.

22. The display apparatus of claim 21, wherein each set of data lines in the display includes a left data line, a center data line, and a right data line, and wherein the processor is further programmed for sequentially applying voltages to the first set includes applying a first voltage to the center data line in the first set, and sequentially applying voltages to the second set includes applying a second voltage to the center data line in the second set, the second voltage being applied concurrently with the application of the first voltage.

23. The display apparatus of claim 21, wherein the first and second display pixels are adjacent, and wherein the processor is further programmed for sequentially applying voltages to the first set by applying a first voltage to a first data line in the first set, and sequentially applying voltages to the second set by applying a second voltage to a second data line in the second set, the second voltage being applied concurrently with the application of the first voltage, and the first and second data lines being adjacent data lines.

24. The display apparatus of claim 21, wherein the first write sequence and second write sequence form a pattern that is repeated in adjacent pairs of display pixels.

25. The display apparatus of claim 21, wherein the first set includes a first data line, a second data line, and a third data line, the first data line being adjacent to each of the second and third data lines, and wherein the processor is further programmed for sequentially applying voltages to the first set by applying a first voltage to the first data line, applying a second voltage to the second data line such that a voltage value of the second data line changes from a positive polarity to a negative polarity, and applying a third voltage to the third data line such that a voltage value of the third data line changes from a negative polarity to a positive polarity, the application of the first voltage being prior to the application of each of the second and third voltages.

* * * * *